United States Patent [19]
Karunasiri et al.

[11] Patent Number: 5,626,021
[45] Date of Patent: May 6, 1997

[54] VARIABLE TEMPERATURE SEAT CLIMATE CONTROL SYSTEM

[75] Inventors: Tissa R. Karunasiri, Van Nuys; David F. Gallup, Pasadena; David R. Noles, Glendale; Christian T. Gregory, Alhambra, all of Calif.

[73] Assignee: Amerigon, Inc., Monrovia, Calif.

[21] Appl. No.: 288,459

[22] Filed: Aug. 10, 1994

Related U.S. Application Data

[63] Continuation-in-part of Ser. No. 156,052, Nov. 22, 1993, Pat. No. 5,524,439.

[51] Int. Cl.⁶ ........................................... F25B 21/02
[52] U.S. Cl. ........................... 62/3.5; 62/3.61; 236/49.3
[58] Field of Search ........................ 62/3.3, 3.5, 3.61, 62/261; 236/49.3

[56] References Cited

U.S. PATENT DOCUMENTS

| | | | |
|---|---|---|---|
| 3,136,577 | 6/1964 | Richard | 297/180 |
| 3,552,133 | 1/1971 | Lukomsky | 62/3.3 |
| 3,635,589 | 1/1972 | McGrath | 236/49.3 |
| 4,065,936 | 1/1978 | Fenton et al. | 62/3.3 |
| 4,655,707 | 4/1987 | Hamilton | 62/3.3 |
| 4,777,802 | 10/1988 | Feher | 62/3.3 |
| 4,905,475 | 3/1990 | Tuomi | 62/3.3 |
| 4,923,248 | 5/1990 | Feher | 297/180 |
| 5,002,336 | 3/1991 | Feher | 297/180 |
| 5,117,638 | 6/1992 | Feher | 62/3.2 |

OTHER PUBLICATIONS

Publication, Abstract *Thermoelectric Air Conditioned Variable Temperature Seat (VTS) & Effect Upon Vehicle Occupant Comfort, Vehicle Energy Efficiency, and Vehicle Environment Compatibility*.

Primary Examiner—William E. Tapolcai
Attorney, Agent, or Firm—Christie, Parker & Hale, LLP

[57] ABSTRACT

A temperature climate control system comprises a variable temperature seat, at least one heat pump, at least one heat pump temperature sensor, and a controller. Each heat pump comprises a number of Peltier thermoelectric modules for temperature conditioning the air in a main heat exchanger and a main exchanger fan for passing the conditioned air from the main exchanger to the variable temperature seat. The Peltier modules and each main fan may be manually adjusted via a control switch or a control signal. Additionally, the temperature climate control system may comprise a number of additional temperature sensors to monitor the temperature of the ambient air surrounding the occupant as well as the temperature of the conditioned air directed to the occupant. The controller is configured to automatically regulate the operation of the Peltier modules and/or each main fan according to a temperature climate control logic designed both to maximize occupant comfort during normal operation, and minimize possible equipment damage, occupant discomfort, or occupant injury in the event of a heat pump malfunction.

24 Claims, 15 Drawing Sheets

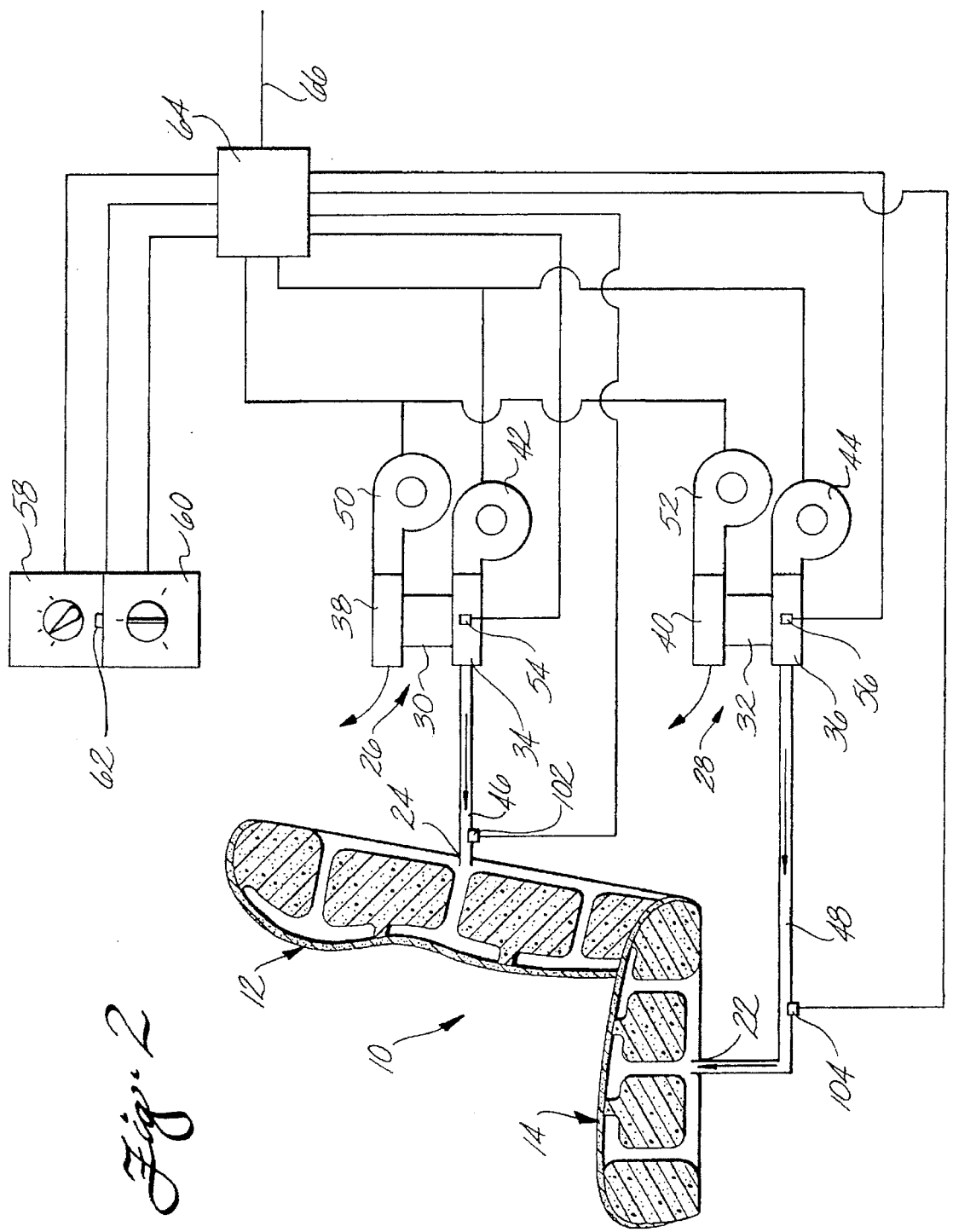

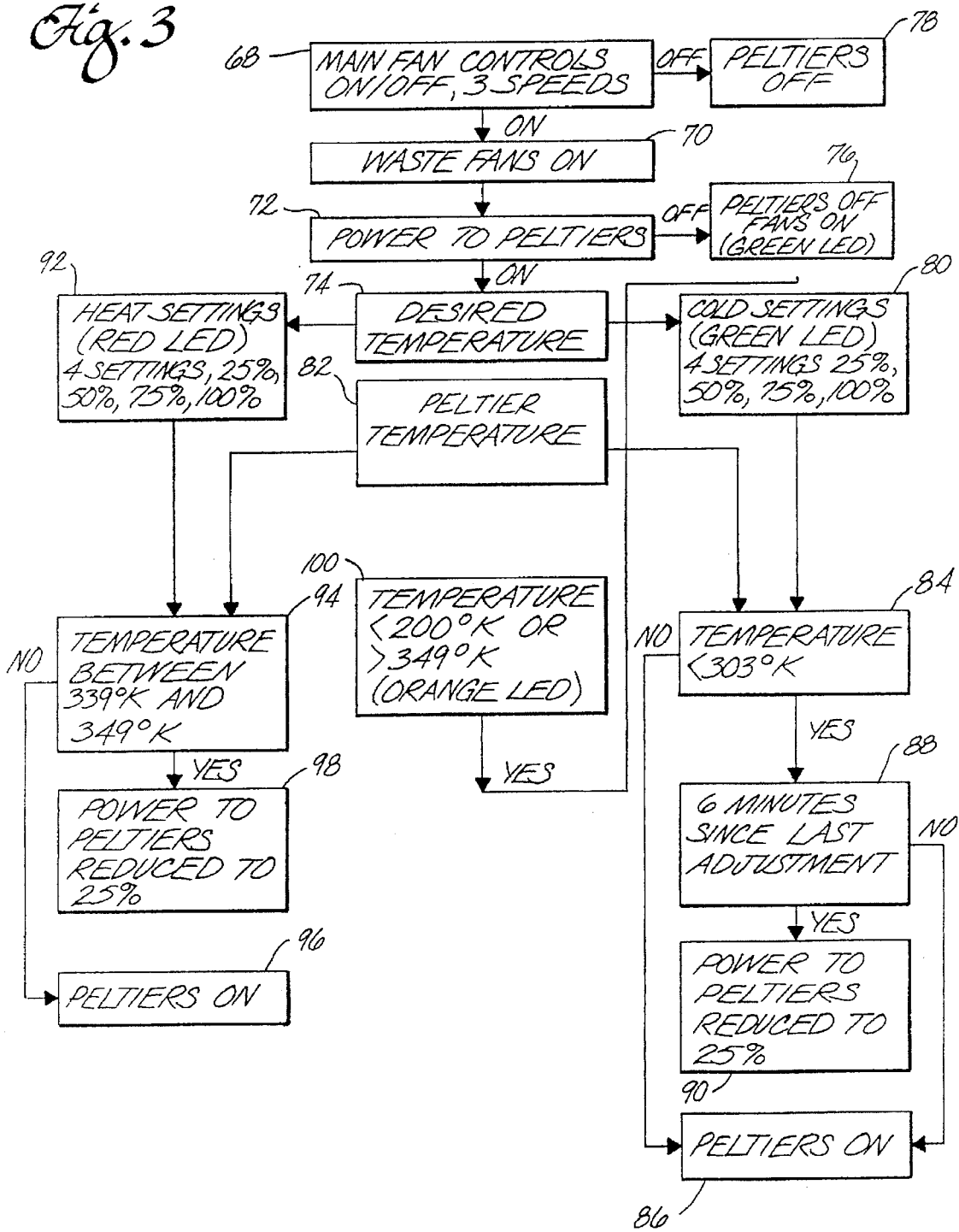

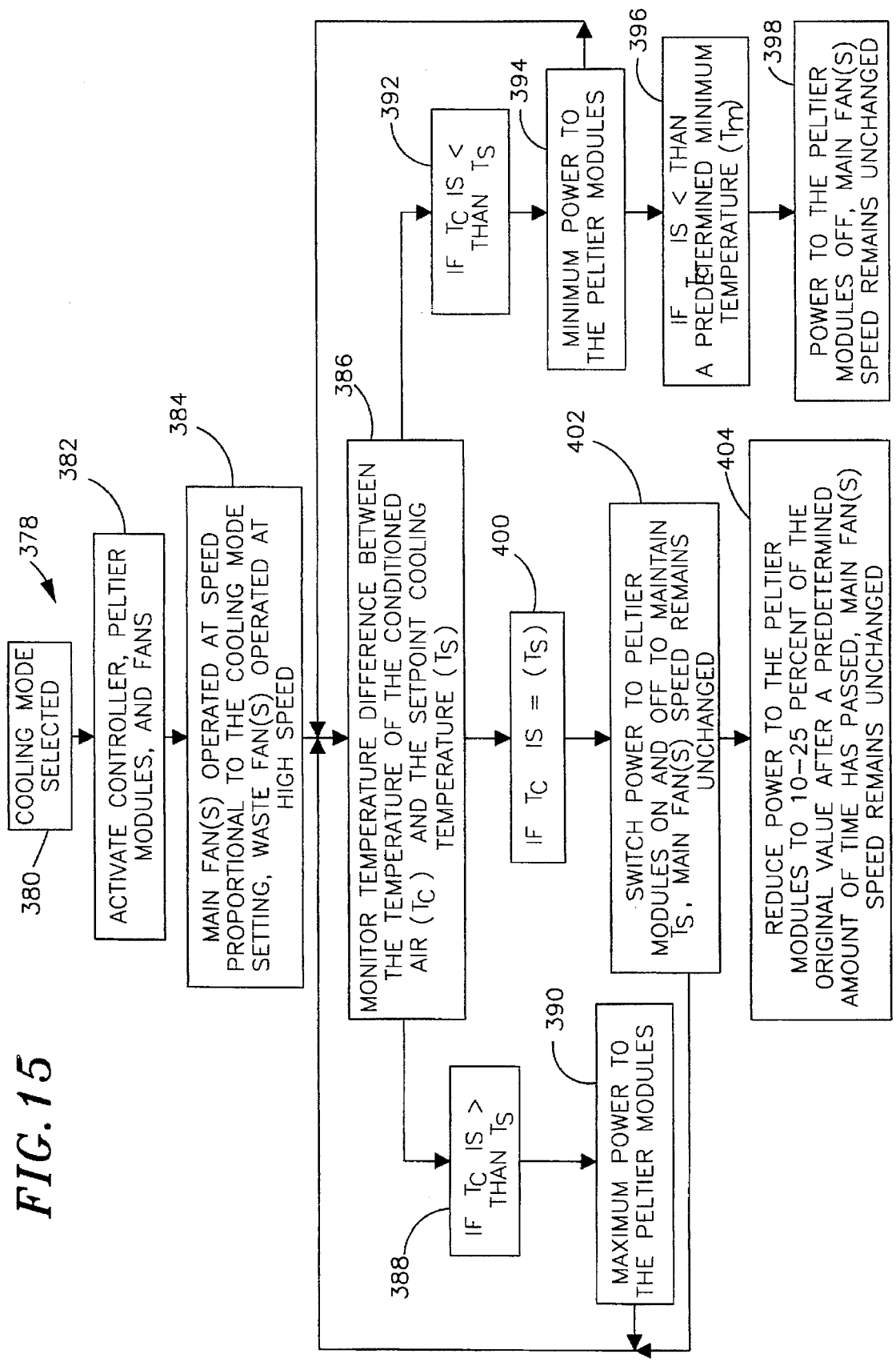

5,626,021

VARIABLE TEMPERATURE SEAT CLIMATE CONTROL SYSTEM

This invention was made with State of California support under a California Energy Commission Contract No. 50-94001. The Commission has certain rights to this invention.

REFERENCE TO PATENT APPLICATION

This application is a continuation-in-part of parent patent application Ser. No. 08/156,052, filed on Nov. 22, 1993, now U.S. Pat. No. 5,524,439.

FIELD OF THE INVENTION

The present invention relates generally to a variable temperature seat and, more specifically, to a method and apparatus for controlling the flow and temperature of a heating or cooling medium that heats or cools, directly or indirectly through the seat to an occupant positioned in such seat.

BACKGROUND OF THE INVENTION

Cooling or heating occupants of buildings, homes, automobiles and the like is generally carried out by convection through modifying the temperature of air surrounding the occupants environment. The effectiveness of convection heating or cooling is largely dependent on the ability of the temperature conditioned air to contact and surround all portions of the occupant's body. Heating and cooling occupants through convection is generally thought to be efficient in such applications as homes, offices, and other like structures where the occupants are not stationary or fixed in one position but, rather are moving around allowing maximum contact with the temperature treated air.

In other applications such as automobiles, planes, buses and the like, the occupants are typically fixed in one position with a large portion of their body's surface against the surface of a seat, isolated from effects of the temperature conditioned air. In such applications the use of distributing temperature conditioned air into the cabin of the vehicle to heat or cool the occupant is less effective due to the somewhat limited surface area of contact with the occupant's body. In addition, oftentimes the surface of the seat is at a temperature close to the ambient temperature upon initial contact by the occupant, increasing the need to provide rapid temperature compensation to the occupant in an effective manner.

To address the problem of providing effective occupant heating or cooling in such applications, seats have been constructed to accommodate the internal flow of a heating or cooling medium and to distribute the same through the seating surface to the surface of the occupant in contact with the seat. A preferred heating and cooling medium is air. A seat constructed in this manner increases the efficiency of heating or cooling a passenger by convection by distributing temperature conditioned air directly to the surface of the occupant that is generally isolated from contact with temperature conditioned air that is distributed throughout the cabin of the vehicle.

U.S. Pat. No. 4,923,248 issued to Feher discloses a seat pad and backrest comprising an internal plenum for distributing temperature conditioned air from a Peltier thermoelectric module through the surface of the seat pad and to an adjacent surface of an occupant. The temperature conditioned air is provided by using a fan to blow ambient air over the fins of a Peltier module. The heating or cooling of the occupant is achieved by changing the polarity of the electricity that powers the Peltier module.

U.S. Pat. No. 5,002,336 issued to Feher discloses a joined seat and backrest construction comprising an internal plenum for receiving and distributing temperature conditioned air through the seat and to an adjacent surface of an occupant. Like U.S. Pat. No. 4,923,248, the temperature conditioned air is provided by a Peltier thermoelectric module and distributed through the internal plenum by an electric fan.

U.S. Pat. No. 5,117,638 issued to Feher discloses a selectively cooled or heated seat construction and apparatus for providing temperature conditioned air. The seat construction comprising, an internal plenum, a plastic mash layer, a metal mesh layer, and perforated outer layer. The apparatus for providing the temperature conditioned air is heat exchanger comprising a Peltier thermoelectric module and a fan. Heating or cooling the occupant is achieved by switching the polarity of the electricity powering the Peltier module.

The seat constructions known in the art, although addressing the need to provide a more efficient method of heating or cooling the occupant, has not addressed the need to provide temperature conditioned air to an occupant in a manner that both maximizes occupant comfort and maximizes power efficiency. Further, seat constructions known in the art have not addressed the possibility of directing temperature conditioned air to a second medium that is in contact with the occupant to effect conductive heat transfer.

The ever increasing awareness of our environment and the need to conserve resources has driven the need to replace hydrocarbon powered vehicles, such as the automobile, with vehicles that are powered by an environmentally friendly power sources such as electricity. The replacement of current hydrocarbon automobiles with electric powered vehicles will only become a reality if the electric powered vehicle can be operated and maintained in a manner equalling or bettering that of the hydrocarbon powered automobile it replaces. Accordingly, the need for electric vehicles to perform in an electrically efficient manner, is important to the success of the electric vehicle.

In order maximize the electrical efficiency of the electric powered vehicle it is necessary that the electrically powered ancillary components of the electric vehicle function at maximum electrical efficiency. The seats known in the art that provide temperature conditioned air to an occupant do not operate in an electrically efficient manner. The temperature of the air being conditioned by the Peltier thermoelectric devices in such seats is adjusted by dissipating the excess power through a resister, i.e., by using a potentiometer. The practice of dissipating excess power instead of providing only that amount of power necessary to operate the Peltier thermoelectric devices makes such seats unsuited for such power sensitive applications as the electric vehicle as well as other applications where electrical efficiency is a concern.

The seats known in the art constructed to provided temperature conditioned air to an occupant are adjustable in that the occupant may either choose to produce heated air or cooled air. However, the seats known in the art are unable to automatically regulate the temperature or flow rate of the cool or heated air being distributed to the occupant in the event that the thermoelectric device malfunctions or in the event that the user falls asleep. An electrical malfunctioning of the thermoelectric device could result in the abnormal heating of the device, causing damage to the thermoelectric device itself. An electrical malfunction could result in the distribution of hot air to the occupant and result in discomfort. Additionally, an initial temperature setting of maximum heat or maximum cold that is left untouched in the event the occupant falls asleep may cause damage to the thermoelectric device itself or may cause discomfort or even injury to the occupant.

The seats known in the art, while able to vary the distribution of air to the seat bottom or seat back via occupant adjustment, do not allow the occupant to vary the temperature of the air passing to or through the seat back or seat bottom, independently. The option of being able to selectively heat one portion of the seat and cool the other may be desirable where the occupant requires such selective treatment due to a particular medical condition or injury. For example, one a cold day it would be desirable to distribute heated air to the seat back for occupant comfort and cooled air to the seat bottom to assist in healing a leg injury that has recently occurred.

Additionally, seats known in the art do not provide for conductive cooling through a non-perforated seating surface and rely entirely on convective heat transfer. Seats known in the art do provide for conductive heating through use of resistance wire placed within the seating surface. However, such seats cannot provide conductive cooling. Conductive heating and cooling is an effective method of transferring heat or cold from a seating surface to contacting portions of a seated occupant.

It is, therefore, desirable that a variable temperature seat comprise a control system and method for regulating the temperature and flow rate of temperature conditioned air to an occupant sitting in the seat. It is desirable that the control system operate the seat in an electrically efficient manner, making it ideal for use in power sensitive applications such as the electric powered vehicle. It is desirable that the control system operate the seat in a manner eliminating the possibility of equipment damage, occupant discomfort or injury. It is desirable that the control system permit the independent distribution of heated or cooled air to the seat back or seat bottom. It is desirable that a variable temperature seat comprise a control system capable of providing conductive as well as convective heat transfer to a seated occupant. It is also desirable that the control system be easy to operate with minimal occupant input.

SUMMARY OF THE INVENTION

There is, therefore, provided in practice of this invention a temperature climate control system for use with a variable temperature seat. The temperature climate control system comprises a variable temperature seat suitable for distributing temperature conditioned air to a seated occupant, at least one heat pump for temperature conditioning ambient air and passing the air to the seat, a temperature sensor, and a controller configured to monitor the temperature and regulate the operation of the heat pumps according to a temperature climate control logic.

Each heat pump comprises a number of Peltier thermoelectric modules for selectively heating or cooling ambient air in a main heat exchanger. The heated or cooled air is passed to the seat by a main exchanger fan. Each heat pump also comprises a waste heat exchanger for removing unwanted heat or cooling from the Peltier modules. The unwanted heat or cooling is passed to the outside environment by a waste exchanger fan.

Each main fan may be manually adjusted to operate at a variety of predetermined speeds via a fan switch. Each Peltier module can be manually adjusted to operate in various heating or cooling modes via a temperature switch. The electrical power to each Peltier is pulsed at a duty cycle corresponding to a particular heating or cooling mode of operation to optimize electrical efficiency. Each heat pump may be operated independently via separate fan and temperature switches, or may be operated simultaneously by a common fan and temperature switch. Alternatively, each heat pump may be operated automatically by the controller when the variable temperature seat is occupied by the activation of an occupant presence switch.

After an initial fan speed and Peltier temperature setting has been selected, the controller monitors the temperature information relayed from each heat pump. In addition, the controller may also be configured to monitor the ambient temperature of the air surrounding the variable temperature seat occupant as well as the temperature of the conditioned air directed to the variable temperature seat occupant, via the use of additional temperature sensors. The controller regulates the operation of each main exchanger fan, each waste exchanger fan, and each Peltier module according to a temperature climate control logic. The control logic is designed to maximize occupant comfort and minimize the possibility of equipment damage, occupant discomfort or even occupant injury in the event of a system malfunction.

The control logic is designed to interrupt or limit the power to the Peltier modules and/or each main exchanger fan in the event that the heat pump temperature exceeds a predetermined maximum temperature or a predetermined minimum temperature, indicating a possible heat pump malfunction. Additionally, the control logic is designed to adjust power to the Peltier modules in the event that the temperature of the conditioned air directed to the variable temperature seat occupant exceeds a predetermined maximum or minimum temperature.

The control logic is also designed to limit the power to the Peltier modules during the cooling mode of operation when the temperature of the cooling air directed to the occupant exceeds a predetermined minimum cooling temperature and the temperature has not been adjusted for a predetermined period of time, thus minimizing possible occupant discomfort associated with overcooling the occupant's back. In addition, the control logic is designed to limit the power to the Peltier modules during the cooling mode of operation when the temperature difference between the ambient air surrounding the variable temperature seat occupant and the conditioned air directed to the occupant is greater than a predetermined amount.

BRIEF DESCRIPTION OF THE DRAWINGS

These and other features and advantages of the present invention will become appreciated as the same becomes better understood with reference to the specification, claims and drawings wherein:

FIG. 1 is a cross-sectional semi-schematic view of an embodiment of a variable temperature seat;

FIG. 2 is a schematic view of a first embodiment of a temperature climate control system according to the present invention;

FIG. 3 is a flow chart illustrating a temperature climate control logic for the embodiment of the invention shown in FIG. 2;

DETAILED DESCRIPTION

Figure 15:
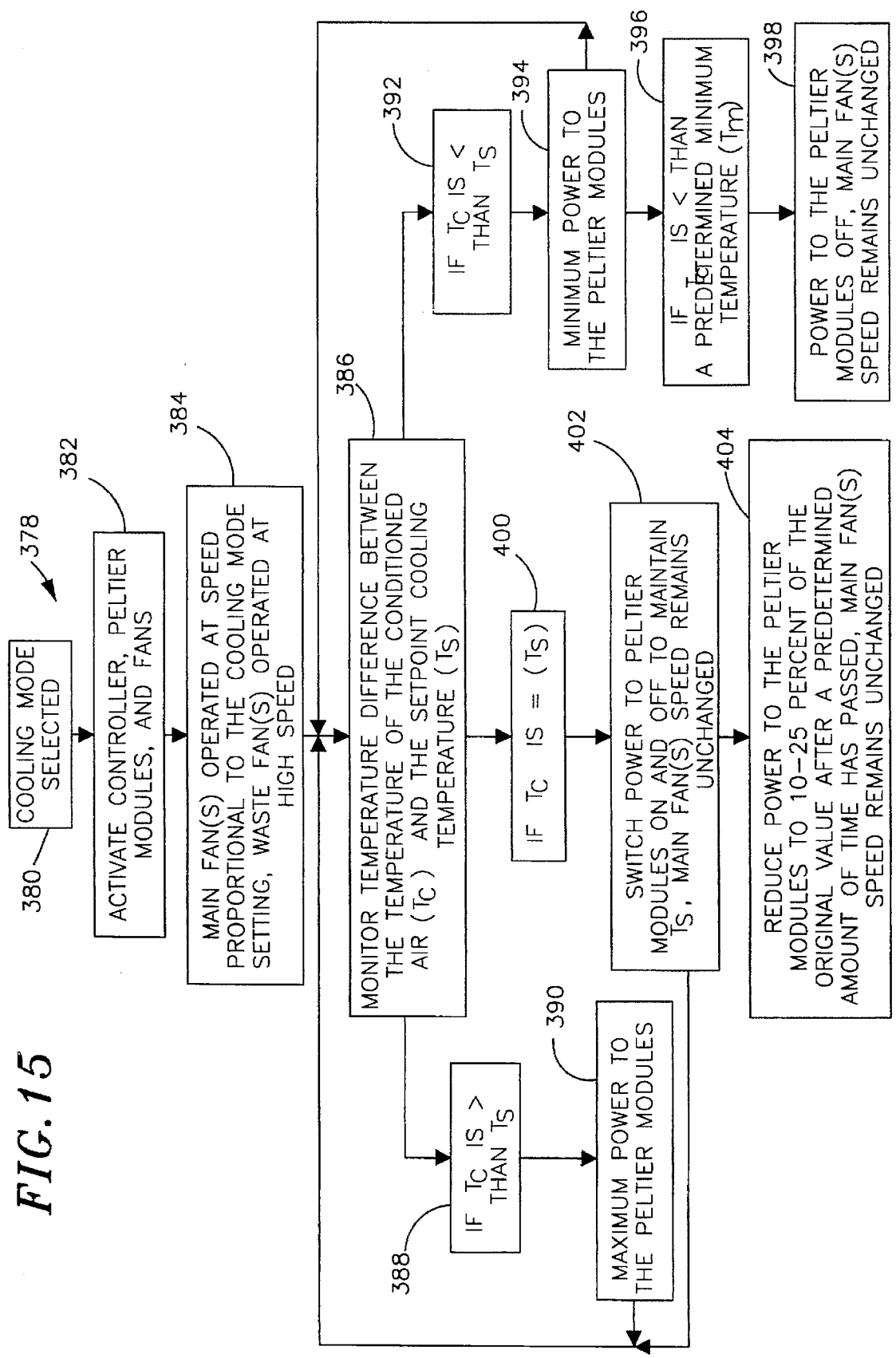
FIG. 15 is flow chart illustrating a cooling mode logic for a third controlling method used with the fourth embodiment of the invention shown in FIG. 11.

A temperature climate control system (TCCS) provided in the practice of this invention may be used to control the temperature of a heat transfer medium, preferably air, being distributed through a variable temperature seat (VTS) and directed to a seated occupant. The TCCS may be used in various VTS applications where it is required that an occupant stay seated for a period of time, such as automobiles, trains, planes, buses, dentists chairs, hair styling chairs and the like, or where an occupant simply desires an added degree of comfort while he/she is sitting at work or in the home, such as office chairs, home recliners and the like. The TCCS configured according to the practice of this invention to operate in a manner providing an occupant seated in a VTS a maximum degree of comfort by allowing the occupant to manually adjust both the flow rate and the temperature of the air being passed through the seat surface and directed to the occupant.

The TCCS is configured to automatically override the manual flow rate and temperature settings when it senses that the temperature of the air being directed to the occupant is above a predetermined maximum temperature set point or is below a predetermined minimum temperature set point. Thus, maximizing both occupant comfort and occupant safety in the event that the occupant either falls asleep or in the event that the device generating the temperature conditioned air malfunctions. The TCCS also comprises timers and is configured to automatically override the manual flow rate and temperature settings during normal operation to prevent back discomfort. Additionally, the device generating the temperature conditioned air is operated in a manner maximizing electrical efficiency, making it well suited for use in applications that are sensitive to electrical consumption, such as electric powered vehicles.

FIG. 1 shows an embodiment of a VTS 10 comprising a seat back 12 and a seat bottom 14 for accommodating the support of a human occupant in the sitting position. FIG. 1 shows a simplified cross-sectional view of a VTS for purposes of illustration and clarity. Accordingly, it is to be understood that the VTS may be constructed in embodiments other than that specifically represented. The VTS may be constructed having a outside surface covering 16 made from a suitable material that allows the flow of air through its surface, such as perforated vinyl, cloth, leather or the like. A padding layer 17 such as reticulated foam may lie beneath the outside surface 16 to increase occupant comfort.

The VTS may be constructed having a metal frame (not shown) that generally defines the seat configuration and having seat bottom and seat back cushions 18 made from foam and the like. A number of air channels 20 are positioned within each seat cushion and extend from the padding layer 17 through the seat cushions and to either a seat bottom air inlet 22 or a seat back air inlet 24. Although a particular embodiment of a VTS has specifically described, it is to be understood that the TCCS according to the present invention is meant to operate with any type of VTS having the same general features.

FIG. 2 shows a first embodiment of the TCCS according to the present invention comprising a VTS 10. The air that is passed through the seat and to the occupant is temperature conditioned by a heat pump. This first embodiment comprises a seat back heat pump 26 for temperature conditioning the air passed through the seat back 12 of the VTS, and a seat bottom heat pump 28 for temperature conditioning the air passed through the seat bottom 14 of the VTS. The seat back heat pump and seat bottom heat pump each comprise at least one thermoelectric device 30 and 32, respectively, for temperature conditioning, i.e., selectively heating or cooling, the air. A preferred thermoelectric device is a Peltier thermoelectric module. Each heat pump may comprise more than one Peltier thermoelectric module. A preferred heat pump comprises approximately three Peltier thermoelectric modules.

Each heat pump comprises a main heat exchanger 34 and 36, enclosing air temperature conditioning fins (not shown) depending from one surface of the Peltier modules, and a waste heat exchanger 39 and 40, enclosing thermal exchanger fins (not shown) extending from the Peltier module surface opposite the main heat exchanger. Attached to one end of each main heat exchanger is an outlet from a main exchanger fan 42 and 44 that serves to pass the temperature conditioned air in each main heat exchanger to the seat back or seat bottom, respectively. Each main exchanger fan may comprise an electrical fan having a suitable flow rate, such as an axial blower and the like. The outlet end of each main heat exchanger is connected to an air conduit 46 and 48 that is connected to the respective seat back air inlet 24 or seat bottom air inlet 22. Accordingly, the temperature conditioned air produced by the Peltier thermoelectric modules in each main heat exchanger is passed through the respective air conduit, through the respective air inlet, into and through the respective seat portion of the VTS to the occupant by the main exchanger fan.

Attached to one end of each waste heat exchanger is an outlet from a waste exchanger fan 50 and 52 that serves to pass unwanted waste heat or cooling produced in each waste heat exchanger to the outside environment surrounding the VTS. Each waste exchanger fan may comprise an electrical fan having a suitable flow rate, such as an axial blower and the like. The waste air exiting each waste heat exchanger fan is usually at an undesirable temperature, i.e., in the cooling mode it is hot air and in the heating mode it is cold air. Consequentially, waste air exiting each waste exchanger may be specifically routed away from any occupant, possibly through the sides of the seat or the like.

Attached to the main exchanger side of the Peltier thermoelectric modules in each heat pump is a temperature sensor 54 and 56. Each temperature sensor may comprise an electric thermocouple and the like.

The operation of the main exchanger fans 42 and 44 can be manually controlled by a fan switch 58. In the first embodiment, it is preferred that the main exchanger fans are operated simultaneously by a single fan switch. The fan switch may comprise an electrical switch configured to provide an off position, and a variety of fan speed settings if desired. It is preferred that the fan switch be configured having an off position and three different fan speed settings, namely low, medium and high. The fan switch may be located within or near the VTS for easy occupant access.

The operation of the waste exchanger fans 50 and 52 can be manually controlled by a separate fan switch (not shown) if desired. However, it is preferred that the waste exchanger fans be activated automatically upon the operation of the main exchanger fans and operate at a single predetermined speed. Accordingly, upon the manual operation of the fan switch 58, both the main exchanger fans are activated to a selected speed and the waste exchanger fans are automatically activated to operate at maximum speed. Configuring the TCCS to operate in this manner maximizes the thermal efficiency of the Peltier modules and reduces the possibility of system damage.

The operation of the Peltier thermoelectric modules can be controlled by a temperature switch 60. In the first embodiment it is preferred that the Peltier thermoelectric modules in both heat pumps be operated simultaneously by a single temperature switch. The temperature switch may comprise an electrical switch configured to provide an off position, and a variety of temperature settings if desired. A preferred temperature switch is configured having an off position, four heating positions, and four cooling positions. Like the fan switch 58, the temperature switch 60 may be located within or near the VTS for easy occupant access.

When the temperature switch is turned to one of the cooling positions a LED lamp 62 located near the temperature switch registers a green color, indicating that the Peltier modules are operating in the cooling mode. When the temperature switch is turned to one of the heating positions the LED lamp registers a red color, indicating that the Peltier modules are operating in the heating mode.

The different heating or cooling modes for the Peltier modules is accomplished by both switching the polarity and limiting the amount of the electrical power routed to the Peltier modules. To optimize the electrical efficiency of the Peltier modules, instead of using a potentiometer to discharge the unwanted portion of the electrical power through a resister, the four different modes of heating and cooling operation are achieved by pulsing electrical power to the Peltier modules at predetermined duty cycles. Accordingly, the different levels of heating or cooling are accomplished by pulsing the electrical power to the Peltier modules at a predetermined duty cycle. In a preferred embodiment, the duty cycle is about 0.02 seconds (50 hz) and the four different levels are accomplished by applying either 25 percent, 50 percent, 75 percent, or 100 percent of the cycle time power. In this embodiment, a 25 percent duty cycle would be on for approximately 0.005 seconds and off for approximately 0.015 seconds for a total cycle length of 0.02 seconds, and then repeated. The 75 percent duty cycle is on for approximately 0.015 seconds and off for approximately 0.005 seconds.

The heating or cooling mode of the Peltier modules is achieved by switching the polarity of the electrical power. The Peltier modules are configured to operate in the heating mode on approximately ten volts DC and in the cooling mode on approximately six volts DC. A DC converter may be positioned outside the controls to supply the heating and cooling voltage. The total duty cycle of the Peltier modules is adjustable from 0.02 to 0.2 seconds. The power for the Peltier modules in each mode was chosen to optimize the efficiency and total thermal power supplied to an occupant of the VTS.

The electrical feeds to and/or outlets from the fan switch 58, temperature switch 60, main exchanger fans 42 and 44, waste exchanger fans 50 and 52, Peltier thermoelectric modules 30 and 32 LED lamp 62, and temperature sensors 54 and 56 are routed to a controller 64. Alternatively, the electrical feeds and signals may first be routed to a printed circuit board in the seat (not shown) that sends a signal to the controller. The controller comprises a power inlet 66 of sufficient electrical capacity to operate all of the aforementioned devices. The controller is configured to receive occupant inputs from the fan switch and the temperature switch and temperature information from the temperature sensors. From this input the controller is configured to make adjustments to the operation of the heat pumps according to a predetermined logic designed to ensure occupant comfort and safety, and protect against system damage.

FIG. 3 is a flow chart illustrating a temperature climate control logic for the first embodiment of the TCCS shown in FIG. 2. The occupant wishing to use the VTS operates the main exchanger fans by activating the fan switch 58 and selecting a desired fan speed (step 68). Upon the activation of the main exchanger fans the waste exchanger fans are also activated to operate at a maximum speed (step 70).

The occupant may activate the Peltier modules for temperature conditioning the air in the VTS by positioning the temperature switch 60 to a desired heating or cooling mode (steps 72 and 74). The Peltier modules can be manually deactivated by selecting the "off" position on the temperature control switch, in which case the power to the fans is maintained as indicated by the LED 62 registering a green color (step 76). Additionally, the Peltier modules are automatically deactivated by the controller when the fan switch is manually placed in the "off" position (step 78).

When the temperature switch is positioned to one of the four cooling modes the LED lamp 62 registers a green color (step 80). The temperature detected by the temperature sensors 54 and 56 in both heat pumps 26 and 28 is passed to the controller (step 82). If the temperature is below about 303° K. (step 84) the power to the Peltier modules remains on (step 86), unless more than six minutes has elapsed since the time that the occupant has last adjusted the temperature (step 88), in which case the power to the Peltier modules is reduced to 25 percent (step 90). It is desirable to reduce the power to the Peltier modules under such circumstances to prevent over cooling of the occupant's back, which has been shown to cause the occupant discomfort after use of the VTS. If the temperature is not below 303° K., however, the power to the Peltier modules is maintained as indicated by the occupant controls (step 86).

When the temperature switch is positioned to one of the four heating modes the LED lamp 62 registers a red color (step 92). If the temperature is below about 339° K. (step 94)

the power to the Peltier modules remains on (step 96). If the temperature is in the range of from 339° K. to 349° K. (step 92) the power to the Peltier modules is reduced to 25 percent until the temperature is below 339° K. (step 98). Reducing the power to the Peltier modules in this situation is desired to prevent the Peltier modules from overheating.

If the temperature of the main heat exchanger side of the Peltier modules is below either below 200° K. or above 349° K. (step 100), regardless of whether the Peltier modules are in the heating or cooling mode, the controller deactivates the Peltier modules (step 76) and maintains the operation of the main exchanger fans and waste exchanger fans. The occurrence of either of the above temperature conditions indicates a system malfunction. In this condition the LED lamp 62 registers a orange color, indicating a system malfunction.

The first embodiment comprises conditioned air temperature sensors 102 and 104 positioned in the air flow of the temperature conditioned air passing to the seat, back and seat bottom, respectively, as shown in FIG. 2. The conditioned air temperature sensors are electrically connected to the controller 64. The temperature climate control logic described above and illustrated in FIG. 3 is configured to deactivate the Peltier modules in the event that the temperature of the conditioned air is greater than about 325° K. or below about 297° K.. While the Peltier modules are deactivated the main exchanger fans continue to run.

Figure 4:
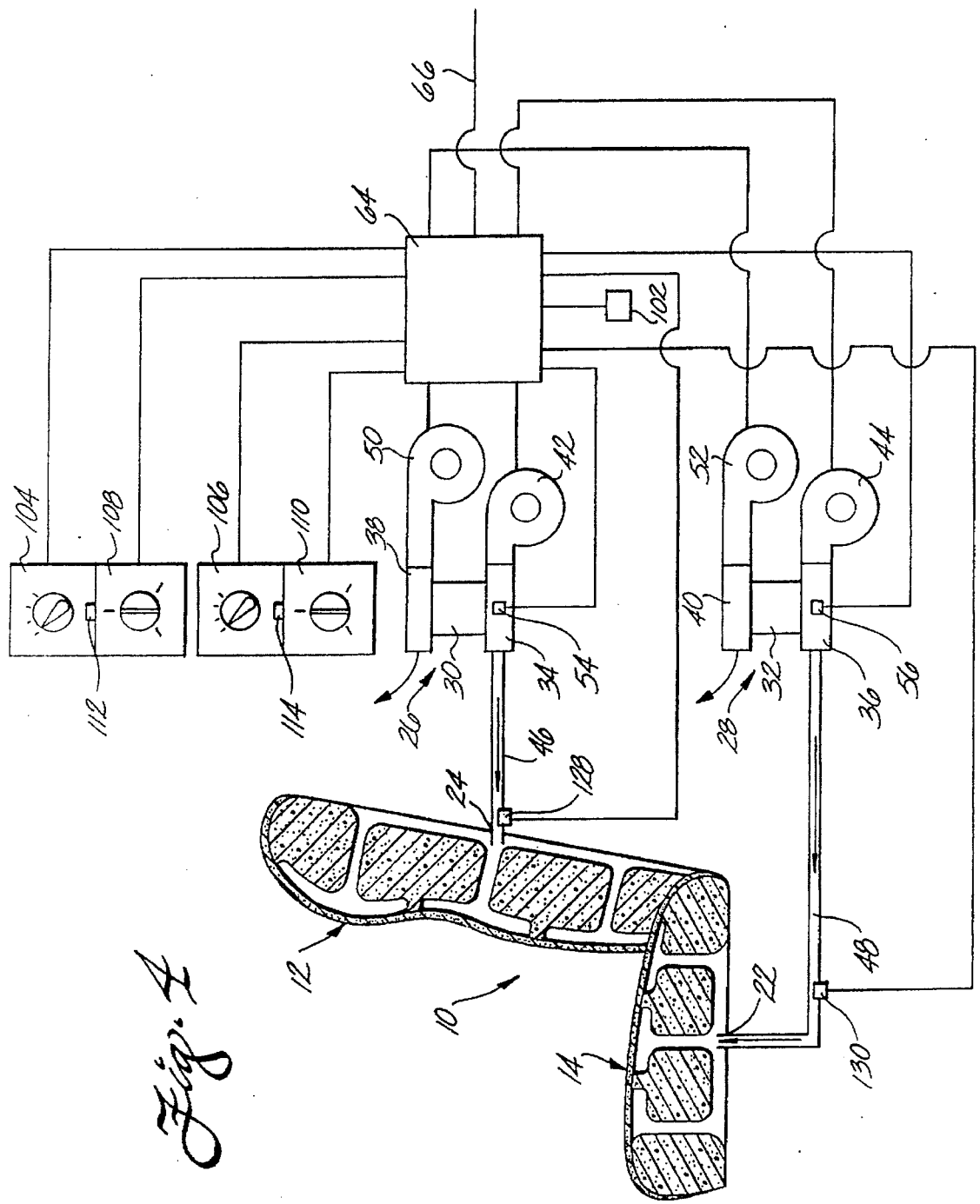
FIG. 4 is a schematic view of a second embodiment of a temperature climate control system according to the present invention.

FIG. 4 shows a second embodiment of the TCCS according to the practice of the present invention. The second embodiment is similar to the first embodiment in all respects, except for the addition of at least one ambient air temperature sensor 102 to monitor the temperature of the air outside of the VTS surrounding the occupant. The temperature sensor is electrically connected to relay ambient air temperature information to the controller 64. More than one ambient air temperature sensor may be used, each being positioned at different locations in the environment surrounding the occupant, to provide an ambient air temperature profile to the controller.

The second embodiment of the TCCS also differs from the first preferred embodiment in that the fan speed and air temperature for the seat back heat pump 26 and the seat bottom heat pump 28 can each be manually adjusted independently by using a separate seat back fan switch 104 and seat bottom fan switch 106, and a separate seat back temperature switch 108 and seat bottom temperature switch 110. The fan switches 104 and 106 and the temperature switches 108 and 110 in the second embodiment are the same as those previously described in the first embodiment. Alternatively, the TCCS may be configured having a single fan switch (not shown) to control the speed of fans 42 and 44 and two temperature switches (not shown) to control the power to each heap pump 26 and 28 independently. The TCCS may also be configured having a single temperature switch (not shown) to control the power of heat pumps 26 and 28 simultaneously and two fan switches to control the speed of each fan 42 and 44 independently.

LED lamps 112 and 114 are located near each temperature switch to indicate the mode of operation selected for each heat pump, e.g., in the off position the LED lamps are off, when both heat pumps are in the cooling mode the LED lamps register a green color, when both heat pumps are in the heating mode the LED lamps register a red color, when there is a temperature error or Peltier module malfunction in either heat pump the LED lamps fast cycle red and green, registering an orange color.

Configuring the manual fan speed and temperature switches in this manner allows the occupant the ability to operate the seat back 12 of the VTS at a different conditions than the seat bottom 14. This may be desirable where a medical condition or injury requires that a particular portion of the occupant's body be maintained at a temperature different from the remaining portion of the occupant, e.g., where a leg injury requires cooling air in the seat bottom of the VTS and the ambient temperature dictates that heated air pass through the seat back for maximum occupant comfort.

Like the first embodiment, the electrical feeds to and/or outlets from the fan switches 104 and 106, temperature switches 108 and 110, main exchanger fans 42 and 44, waste exchanger fans 50 and 52, Peltier thermoelectric modules 30 and 32, temperature sensors 54 and 56, LED lamps 112 and 114, and the ambient air temperature sensor 102 are routed to the controller 64.

Figure 5:
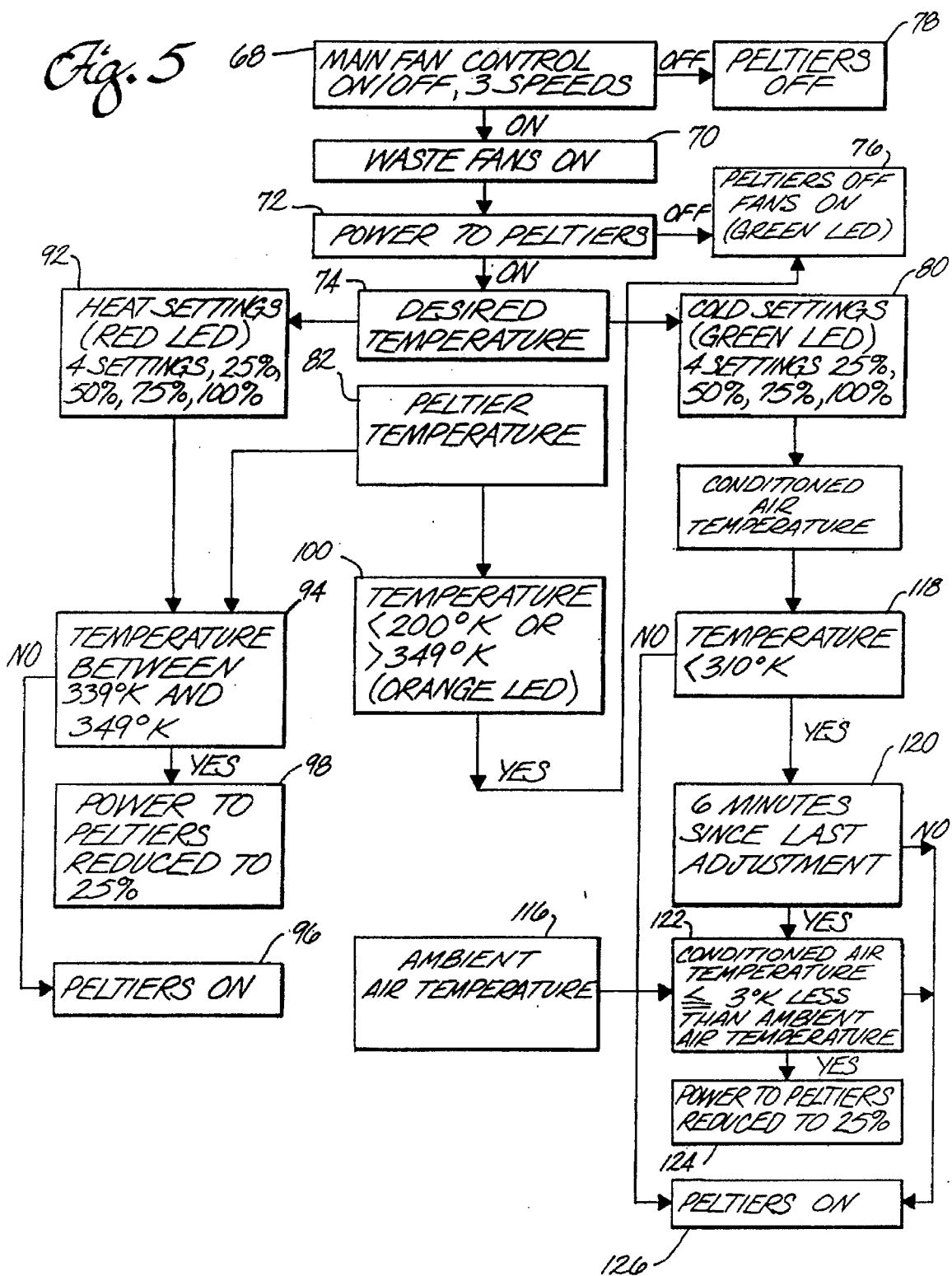
FIG. 5 is a flow chart illustrating a temperature climate control logic for the embodiment of the invention shown in FIG. 4.

FIG. 5 is a flow chart illustrating a temperature climate control logic for the second embodiment of the TCCS shown in FIG. 4. The control logic is similar to that previously described above and shown in FIG. 3, except for the additional temperature inputs from the ambient temperature sensor (step 116) and the conditioned air sensor, and except when the Peltier modules are being operated in the cooling mode and the temperature of the conditioned air from the seat back heat pump 26 is below about 310° K. (step 119). When the conditioned air temperature is below about 310° K., if it has been greater than six minutes since the last temperature adjustment by the occupant (step 120), and the conditioned air temperature of the conditioned is approximately 3° K. or more below the temperature of the ambient air surrounding the occupant (step 122), the controller reduces the power to the Peltier modules in the seat back heat pump 26 to approximately 25 percent (step 124). If the temperature is below about 310° K., but it has either been less than six minutes since the last manual temperature adjustment or the conditioned air temperature is less than 3° K. below the ambient temperature, the power to the Peltier modules in the seat back heat pump remains on at the occupant controlled setting (step 126).

Like the control logic described in FIG. 3, the reason for reducing the power to the Peltier modules under such conditions is to regulate the amount of cooling air directed to an occupant's back to prevent possible discomfort after using the VTS.

The second embodiment also comprises conditioned air temperature sensors 128 and 130 positioned in the air flow of the temperature conditioned air passing to the seat, back and bottom, respectively, as shown in FIG. 4. The conditioned air temperature sensors are electrically connected to the controller 64. The temperature climate control logic described above and illustrated in FIG. 5 is configured to deactivate the Peltier modules in the event that the temperature of the conditioned air directed to the occupant is greater than about 325° K. or below about 297° K.. While the Peltier modules are deactivated the main exchanger fans continue to run.

Figure 6:
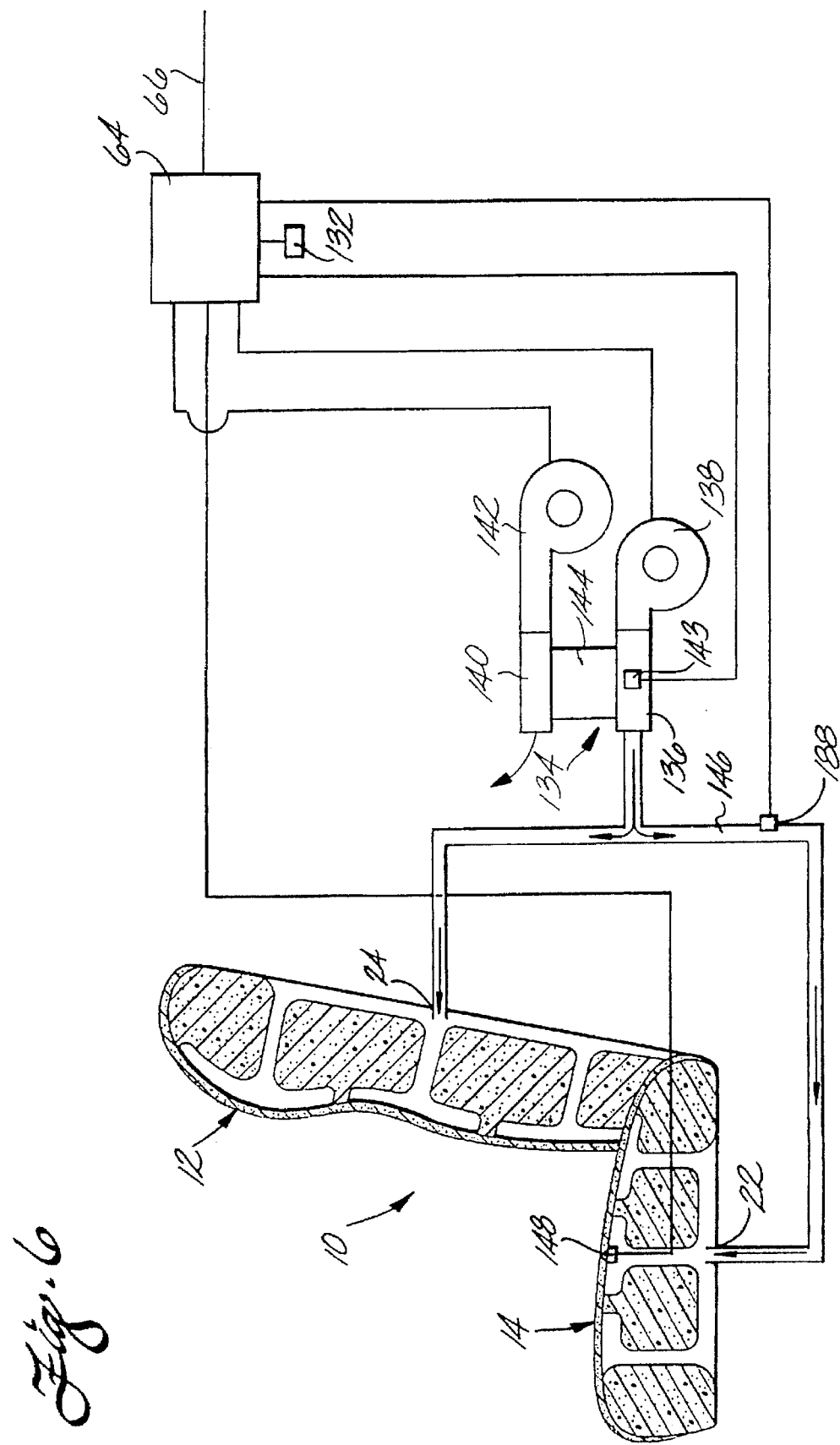
FIG. 6 is a schematic view of a third embodiment of a temperature climate control system according to the present invention.

FIG. 6 shows a third embodiment of the TCCS according to the practice of this invention. The third embodiment is similar to the first embodiment in all respects except for two. One is the addition of at least one ambient air temperature sensor 132 to monitor the temperature of the air outside of the VTS surrounding the occupant. The temperature sensor is electrically connected to feed temperature information to the controller 64. More than one ambient air temperature sensor may be used, each being positioned at different locations in the environment surrounding the occupant, to provide an ambient air temperature profile to the controller.

The second difference in the third embodiment of the TCCS is that only a single heat pump 134 is used to provide temperature conditioned air to both the seat back 12 and the seat bottom 14. The single heat pump is similar to the seat back heat pump 26 and seat bottom heat pump 28 previously described in the first embodiment in that it comprises a main heat exchanger 136, a main exchanger fan 138, a waste heat exchanger 140, a waste exchanger fan 142 and a Peltier module temperature sensor 143. However, instead of three Peltier thermoelectric modules, the single heat pump 134 comprises four Peltier thermoelectric modules 144. The temperature conditioned air from the main heat exchanger is passed to the seat back 12 and seat bottom 14 of the VTS by an air manifold 146 connected at one end to the outlet of the main heat exchanger 136 and at the other end to the seat back air inlet 24 and seat bottom air inlet 22. Alternatively, the third embodiment of the TCCS may comprise a double heat pump arrangement similar to that previously described in the first embodiment.

The third embodiment of the TCCS also differs from the first embodiment in that the main exchanger fan speed and the heat pump air temperature are not manually adjustable by the occupant. Rather, the fan speed and the air temperature are controlled automatically by the controller 64. Additionally, an occupant presence switch 148 is located within the VTS that is activated upon the presence of an occupant in the seat. The occupant presence switch may comprise a weight sensitive switch and the like located in the seat back or seat bottom. In a preferred embodiment, the occupant presence switch is located in the seat bottom and is electrically connected to the controller to relay the presence of an occupant. The use of a occupant presence switch to control the activation of the VTS is desired for purposes of conserving electricity when the VTS is not occupied and when it is not practical or desirable to give individual control over the seats. e.g., in bus passenger seating applications.

Figure 7:
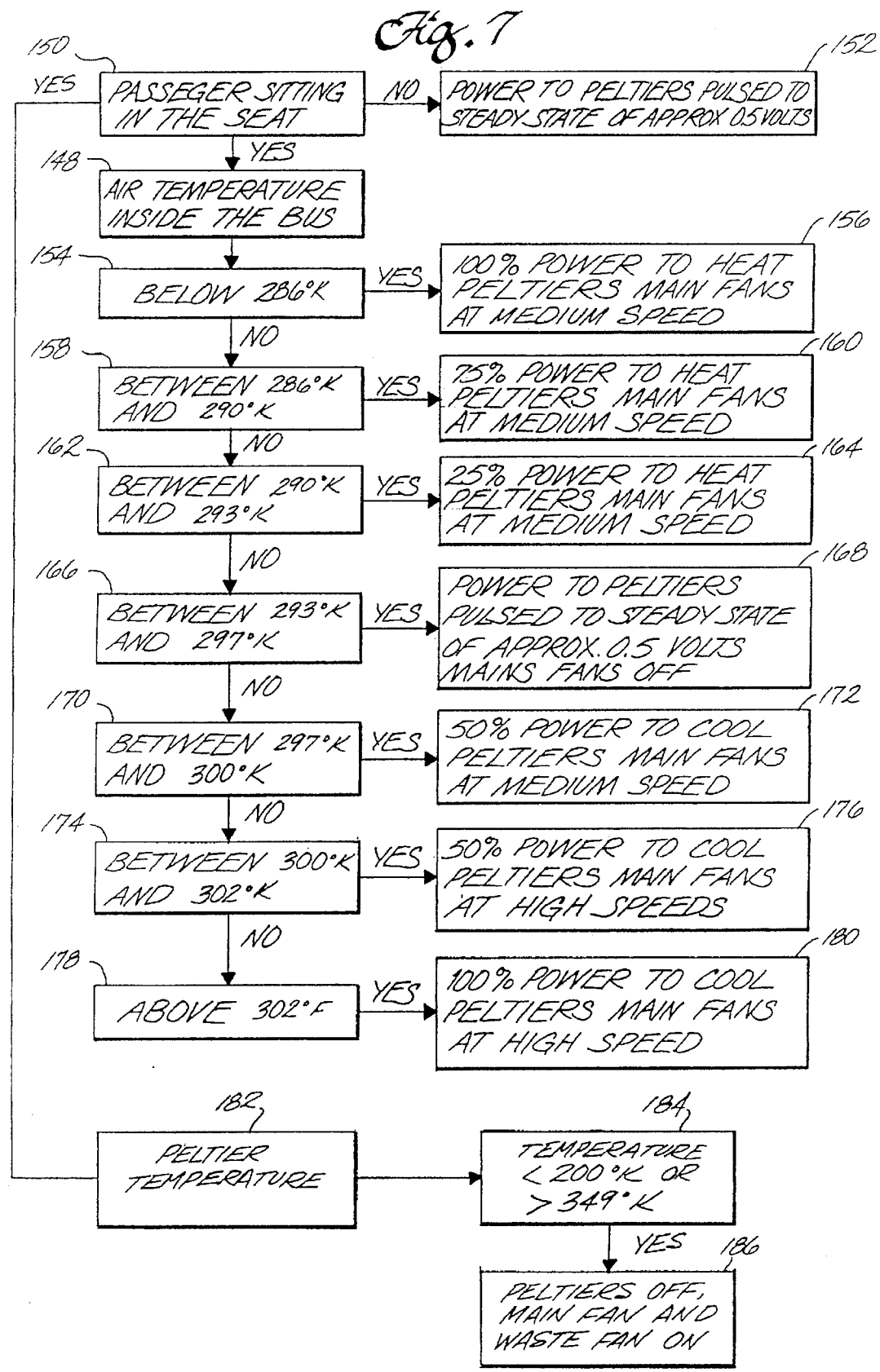
FIG. 7 is a flow chart illustrating a temperature climate control logic for the embodiment of the invention shown in FIG. 6.

FIG. 7 is a flow chart illustrating a temperature climate control logic for the third embodiment of the TCCS as shown in FIG. 6. The activation of the main exchanger fan 138 is controlled by an occupant sitting in the VTS (step 150), which activates the occupant presence switch, and the ambient conditions inside the vehicle as transmitted to the controller by the ambient temperature sensors (step 148). To ensure a rapid temperature response upon placement of an occupant in the VTS, the controller pulses electrical power to the Peltier modules in the absence of an occupant at a steady state of voltage in the range of from 0.5 to 1 volt (step 152). The voltage that is actually applied during the duty cycle may be six or twelve volts. By maintaining a slow continuous pulse of power to the Peltier modules the transient time for achieving the desired temperature of conditioned air upon the presence of an occupant in the VTS is greatly minimized.

Once an occupant is seated in the VTS, the particular main fan speed and Peltier operating mode selected by the controller is dependent upon the ambient temperature surrounding the VTS occupant. When the ambient temperature is less than about 286° K. (step 154) the controller selects a heating mode of operation and passes 100 percent power to the Peltier modules and operates the main exchanger fan at medium speed (step 156). Upon the activation of the main exchanger fan the waste exchanger fan is also activated at high speed.

When the ambient temperature is between 286° K. and 290° K. (step 158) the controller selects a heating mode of operation and passes 75 percent power to the Peltier modules and operates the main exchanger fan at medium speed (step 160). When the temperature is between 290° K. and 293° K. (step 162) the controller selects a heating mode of operation and passes 25 percent power to the Peltier modules and operates the main exchanger fan at medium speed (step 164).

When the ambient temperature is between 293° K. and 297° K. the (step 166) the controller pulses power to the Peltier modules at a steady state of approximately 0.5 volts and deactivates the main exchanger fan (step 168).

When the ambient temperature is between 297° K. and 300° K. (step 170) the controller selects a cooling mode of operation and passes 50 percent power to the Peltier modules and operates the main exchanger fan at medium speed (step 172). When the ambient temperature is between 300° K. and 302° K. (step 174) the controller selects a cooling mode of operation and passes 50 percent power to the Peltier modules and operates the main exchanger fan at high speed (step 176). When the ambient temperature is above 302° K. (step 178) the controller selects a cooling mode of operation and passes 100 percent power to the Peltier modules and operates the main exchanger fan at high speed (step 180).

In either the heating mode of operation (ambient temperatures up to 293° K.) or the cooling mode of operation (ambient temperatures above 297° K.), a Peltier module temperature (step 182) below 200° K. or above 349° K. (step 184) causes the controller to deactivate the Peltier modules and maintain the operation of the main exchanger fan and waste exchanger fan (Step 186). Either of the above conditions indicate a system malfunction.

The third embodiment also includes a conditioned air temperature sensor 188 positioned in the air flow of the temperature conditioned air passing to the seat, as shown in FIG. 6. The conditioned air temperature sensor is electrically connected to the controller 64. The temperature climate control logic described above and illustrated in FIG. 7 is configured to deactivate the Peltier modules 144 in the event that the temperature of the conditioned air passing to the seat and to the occupant is greater than about 325° K. or below about 297° K. While the Peltier modules are deactivated the main exchanger fans continue to run.

The third embodiment of the TCCS as specifically described above and illustrated in FIG. 6 is used for controlling multiple VTSs in multi-occupant applications such as buses, trains, planes and the like. In such an application the main exchanger fan, waste exchanger fan, Peltier modules, temperature sensor, and weight sensitive switch from each VTS are electrically connected to a common controller. Multiple ambient air temperature sensors may be placed at different locations within the vehicle to provide an accurate temperature profile throughout the interior of the vehicle. The common controller is configured to accommodate inputs from the multiple ambient air temperature sensors. The common controller may be configured to control the main fan speed and mode of operation for the Peltier modules in the same manner as that specifically described above and illustrated in FIG. 7, taking into account the possibility of different ambient temperature zones within the vehicle surrounding each VTS.

Although limited embodiments of the temperature climate control system have been described and illustrated herein, many modifications and variations will be apparent to those skilled in the art. For example, it is to be understood within the scope of this invention that a temperature climate control system according to the present invention may comprise means for automatically adjusting the flow of temperature conditioned air from a single heat pump to the seat back or the seat bottom.

Figure 8:
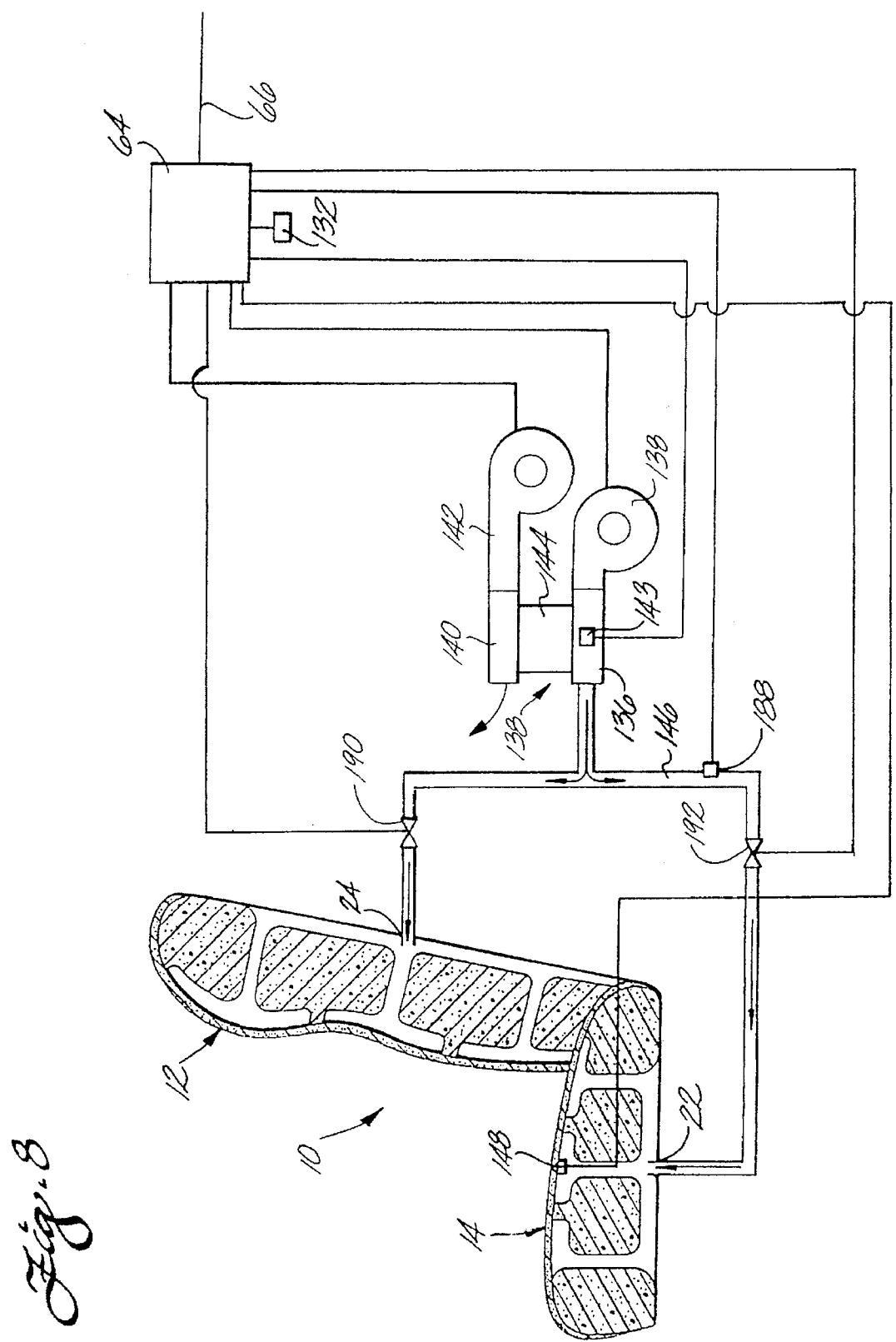
FIG. 8 is a schematic view of an alternative embodiment of a temperature climate control system according to the present invention.

FIG. 8 illustrates an alternative embodiment of the third embodiment of the TCCS, incorporating the use of valves 190 and 192 placed in the air manifold 146 leading to the seat back and the seat bottom, respectively. The valves are activated electrically by a controller 64 according to a predetermined control logic. The control logic may be the same as that specifically described above and illustrated in FIG. 7 for the third embodiment, with the addition that controller limits the flow of cooling air to the seat back by closing valve 190 in the event that the occupant receives too much cooling air over a period of time. This embodiment would help eliminate the occurrence of occupant discomfort after using the VTS.

Figure 9:
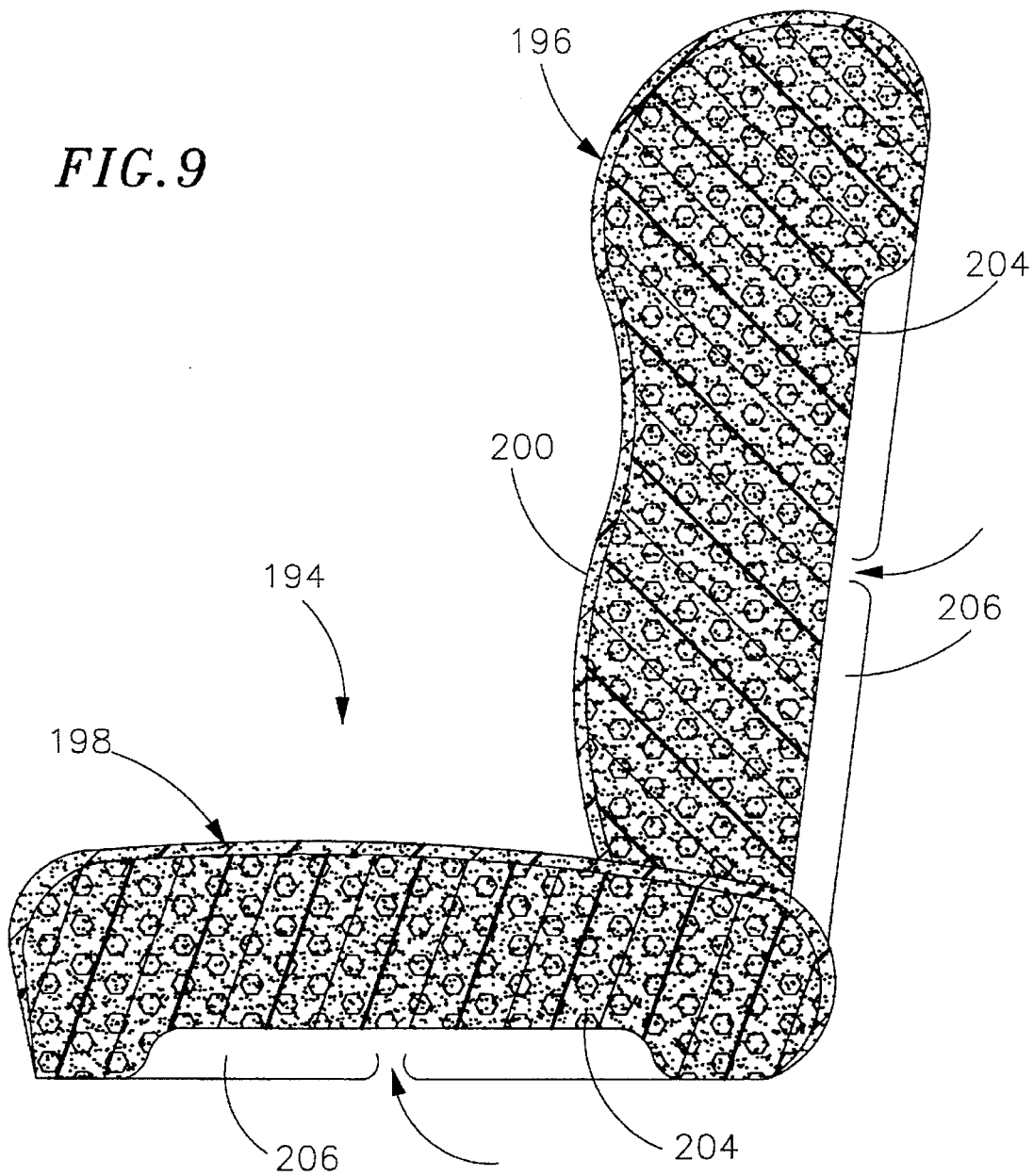
FIG. 9 is a cross-sectional semi-schematic view of a second embodiment of a variable temperature seat without convective heat transfer channels.

FIG. 9 illustrates a second embodiment of a VTS 194 including a seat back 196 and seat bottom 198 for accommodating the support of a human occupant in a seated portion. The VTS 194 includes an outside surface covering 200 that is made from a suitable material that allows the flow of air through its surface, such as cloth, perforated vinyl, perforated leather and the like. A padding layer 202, such as reticulated foam, is disposed beneath the outside surface covering 200 to increase occupant comfort. Unlike the first embodiment of the VTS 10 shown in FIG. 2, the VTS 194 does not include air channels that extend through the seat bottom and seat back cushions 18. Rather, the VTS 194 includes seat bottom and seat back cushions 204 that extend from the padding layer 202 to an air inlet distributor 206 disposed along a backside surface of the seat back and seat bottom.

The seat bottom and seat back cushions 204 can be made from a porous material such as foam and the like that is capable of accommodating air flow therethrough, so that conditioned air introduced into each air distributor 206 is passed through the seat back and seat bottom cushions, through the padding layer 202, through the surface covering 200 and onto the adjacent surface of a seated occupant. Accordingly, rather than passing conditioned air through the cushions via air channels disposed within the cushions, the conditioned air is passed through the cushion material itself. This avoids the need to manufacture seat back and seat bottom cushions having a number air channels therethrough and, therefore, reduces the cost and time associated with manufacturing the VTS.

Figure 10:
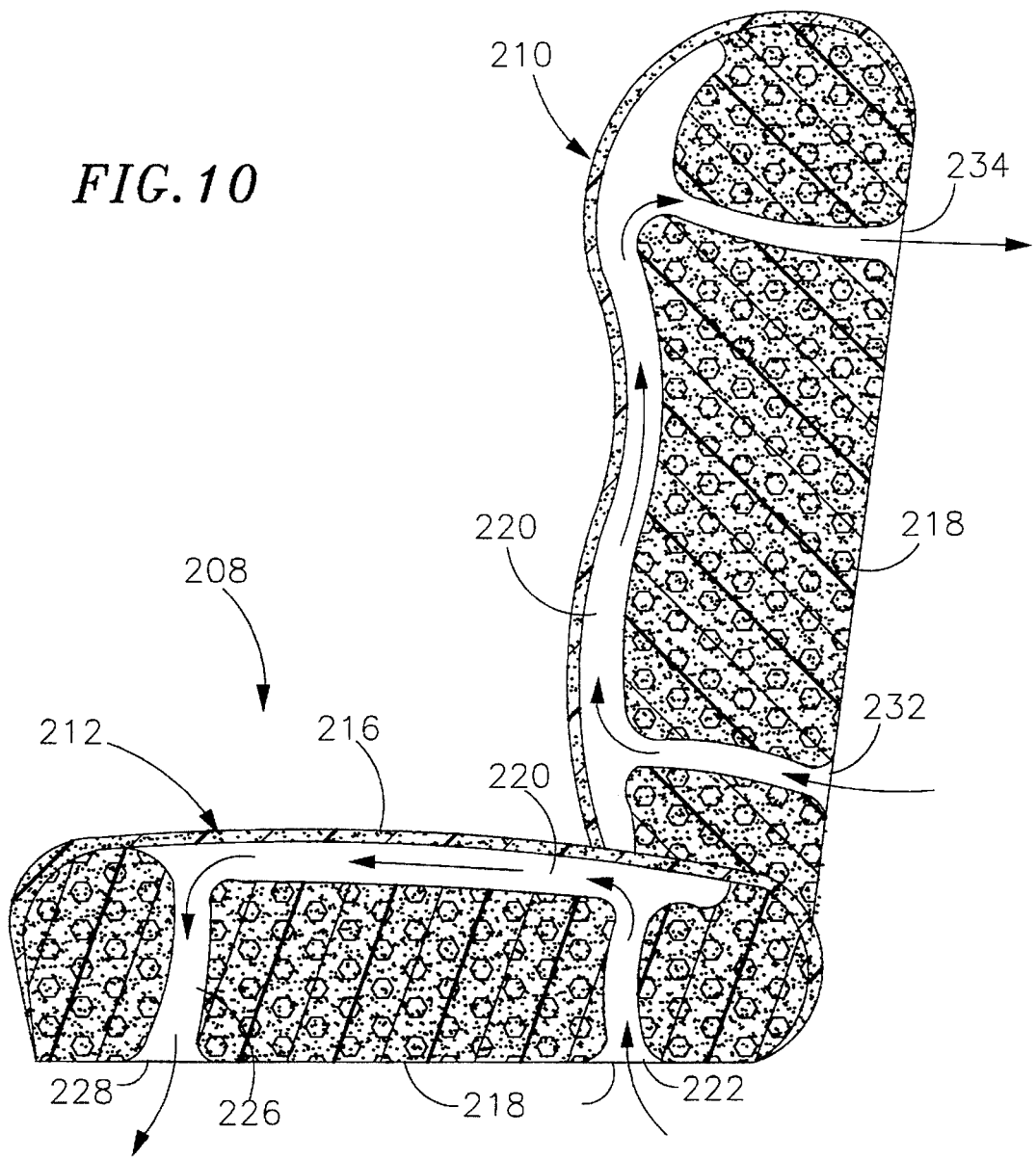
FIG. 10 is a cross-sectional semi-schematic view of a third embodiment of a variable temperature seat including air channels for effecting conductive heat transfer.

FIG. 10 illustrates a third embodiment of a VTS 208 including a seat back 210 and seat bottom 212 for accommodating the support of a human occupant in a seated portion. The VTS 208 includes an outside surface covering 214 that is made from a non-perforated material, such as vinyl, leather and the like. Unlike the first and second embodiments of the VTS, the third embodiment of the VTS 208 relies on conductive heat transfer, rather than convective heat transfer, to providing heating and cooling to a seated occupant.

The VTS may include a padding layer 216 disposed beneath the outside surface covering 214 to provide added comfort to a seated occupant and improve air distribution beneath the seat cover. Seat back and seat bottom cushions 218 extend from the padding layer 216 to a backside surface of each seat bottom and seat back. At least one air channel 220 is interposed between the padding layer 216 and the seat back and seat bottom cushions, and extends along a length of the seat bottom and seat back. The air channel 220 disposed within the seat bottom 212 comprises an air inlet channel 222 at one end of the seat bottom that extends through the seat cushion 218 to an inlet opening 224 at the backside of the seat bottom, and an air outlet channel 226 at an opposite end of the seat bottom that extends through the seat cushion 218 to an outlet opening 228 at the backside of the seat bottom. The air channel 220 disposed within the seat back 210 comprises an air inlet channel 230 at one end of the seat back that extends through the seat cushion 218 to an inlet opening 232 at the backside of the seat back, and an air outlet channel 234 at an opposite end of the seat back that extends through the seat cushion 218 to an outlet opening 236 at the backside of the seat back.

The VTS 208 provides heating and cooling to a seated occupant via conductive heat transfer by recirculating temperature conditioned air against a backside surface of the padding layer 216. Alternatively, the VTS 208 may be constructed without the padding layer, with a padding layer of minimal thickness, or with a porus padding layer so that conditioned air recirculated through the air channels 220 is in direct contact with a backside surface of the surface covering 214 to better facilitate conductive heat transfer to the occupant seated on the front side surface of the surface covering. As will be discussed in greater detail below, temperature conditioned air enters the seat bottom and seat back via respective air inlet openings 224 and 232, and is circulated across and/or through the padding layer 216 as it is passed through the respective air channels 220. The conditioned air exits the seat bottom and seat back via the respective outlet openings 228 and 236, is again conditioned within a heat pump, and is directed again into each seat bottom and seat back.

Although particular embodiments of the VTS have been described and illustrated, it is understood that other embodiments of the VTS may be constructed that are within the scope of this invention. For example, an alternative embodiment of a VTS may include a hybrid configuration that provides heating and cooling to a seated occupant via both convective and conductive heat transfer. In such embodiment, the VTS can be constructed having a number of air channels disposed therein to direct temperature conditioned air through a perforated portion of an outside surface covering to an adjacent surface of the seated occupant (such as that shown in FIGS. 1 and 10) to provide convective heating and cooling. In such embodiment, the VTS may also comprise a number of air channels disposed along a backside surface of a non-perforated portion of the outside surface covering to accommodate recirculation of temperature conditioned air to provide conductive heat transfer to an adjacent surface of the seated occupant (such as that shown in FIG. 10). For example, the VTS can be configured with an outside surface covering having a non-perforated portion to facilitate conductive heat transfer positioned at the center of each seat bottom and seat back, defining the primary seating surface, and a perforated portion to facilitate convective heat transfer posited at each side of the central portion, defining a peripheral portion of the seating surface.

Additionally, the VTS may be configured to facilitate conductive heat transfer to and from a seated occupant using a heat transfer medium other than air, such as water and the like. Accordingly, in such an embodiment, the liquid heat transfer medium would be circulated through the seat and be in contact with a backside portion of a seating surface.

Additionally, an alternative embodiment of the VTS can be configured with valves and the like to effect convective heat transfer during initial operation of the VTS and switch to conductive heat transfer after a predetermined state of operation has been achieved, by first directing temperature conditioned air to the perforated portion of the seat, e.g., the side edges of the seating surface, and then switching the routing of the temperature conditioned air to the non-perforated portion, e.g., the central portion of the seating surface.

Figure 11:
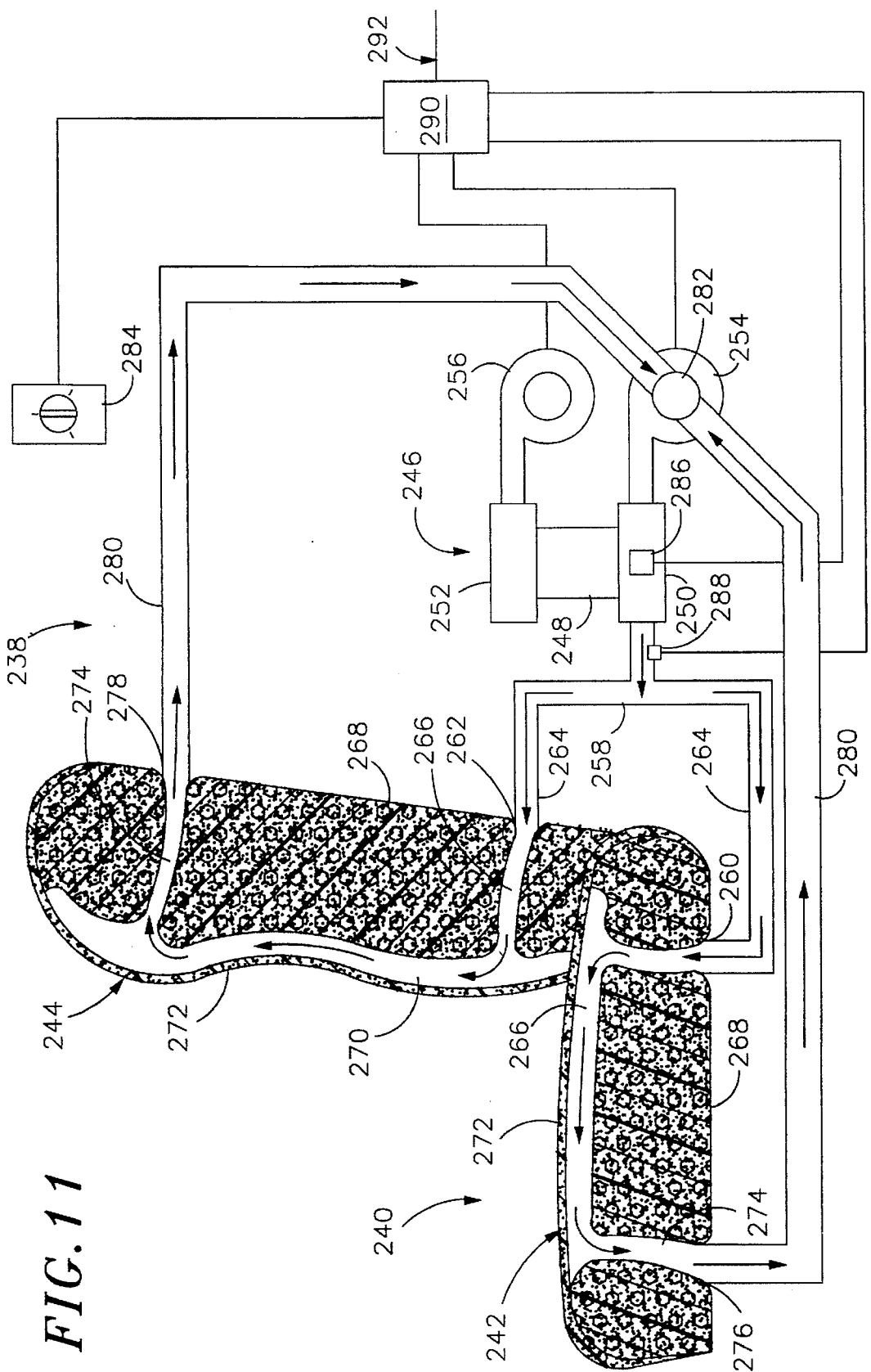
FIG. 11 is a schematic view of a fourth embodiment of a temperature climate control system according to the present invention.

FIG. 11 illustrates a fourth embodiment of the TCCS 238 comprising a third embodiment of the VTS 240 as described above and illustrated in FIG. 10. The TCCS is configured to accommodate recirculation of temperature conditioned heat transfer medium, preferably air, through the seat bottom 242 and seat back 244 to provide conductive heating and cooling to a seated occupant. The TCCS comprises at least one heat pump 246 of the type previously described for the first, second, and third embodiments of the TCCS and illustrated in FIGS. 2, 4 and 6, including at least one Peltier thermoelectric module 248, a main heat exchanger 250, a waste heat exchanger 252, and at least one fan. Accordingly, the main heat exchanger and waste heat exchanger may be configured to share a common fan. In a preferred embodiment, the heat pump comprises at least one main exchanger fan 254, and a waste exchanger fan 256.

The main exchanger fan 254 has an outlet connected to one end of the main exchanger 250 and serves to pass air that has been temperature conditioned by the Peltier modules within the main exchanger to an inlet air manifold 258. The inlet air manifold is connected to air inlet openings 260 and 262 in the seat bottom 242 and seat back 244, respectively, by air inlet tubing 264. Temperature conditioned air is passed through the air inlet manifold 258 in parallel flow through the air inlet tubing, through the air inlet openings, and into the seat bottom and seat back of the VTS.

Temperature conditioned air is routed through each seat bottom and seat back via at least one air inlet channel 266 disposed through a seat cushion 268 at one end of the cushion, at least one air channel 270 interposed between an outside surface cover 272 and the seat cushion 268 and extending along a length of the seat bottom and seat back, and at least one air outlet channel 274 disposed through the seat cushion at an opposite end of the cushion. The temperature conditioned air passed through the air channels 270 is in contact with a backside surface of the cover 272, effecting conductive heat transfer through its thickness, and to a front side surface of the cover and to an adjacent surface of a seated occupant.

The temperature conditioned air exits the seat bottom and seat back via air outlet openings 276 and 278, respectively, after it has effected conductive heat transfer to the outside surface cover 272. Each air outlet opening is connected by air outlet tubing 280 to an inlet end or intake 282 of the main exchanger fan 254. The temperature conditioned air that exits the seat bottom and seat back is directed in parallel flow to the intake 282 of the main fan 254 where it is passed by the fan into the main exchanger 250 and reconditioned before again being introduced into the VTS. Accordingly, the TCCS 238 is configured to accommodate the recirculation of temperature conditioned air through the VTS to accommodate heating and cooling via conductive heat transfer.

The TCCS 238 comprises a control switch 284 for operation by a seat occupant to simultaneously activate operation of the Peltier thermoelectric modules 248, main exchanger fan 254, and waste exchanger fan 256 according to cooling and heating control logic described in detail below. The control switch 284 an analog switch that is capable being switched to an off position, or to provide a continuously variable temperature adjustment. For example, the control switch may be configured to provide a continuum of different cooling temperatures between approximately 65° F. and 75° F., and a continuum of different heating temperatures between approximately 76° F. and 85° F.

At least one temperature sensor 286, in the form of a thermocouple and the like, is attached to the main exchanger 250 of the heat pump 246 to provide an indication of the operating temperature of the Peltier modules 248. At least one temperature sensor 288, in the form of a thermocouple and the like, is also located within the inlet air manifold 258 to provide an indication of the temperature of the air exiting the main exchanger 250. The temperature sensors 288 may be mounted at other locations within the temperature conditioned air recirculation conduits as to provide further temperature information if desired.

Electrical leads to the Peltier modules 248, main exchanger fan 254, waste exchanger fan 256 extend from a controller 290. The controller comprises a power inlet 292 of sufficient electrical capacity to operate all of the aforementioned devices. The controller is configured to receive occupant input via the control switch 284, and to receive temperature information from the main exchanger temperature sensor 286 and conditioned air temperature sensor 288. From these inputs the controller is configured to make adjustments to the operation of the heat pump 246 and main exchange fan or fans 254 according to a predetermined cooling and heating control logic designed to ensure occupant comfort and safety, and protect against system damage.

The controller 290 is configured to route DC voltage in the range of from 0 to 12 volts to the Peltier modules 284. In the cooling mode, the controller can route up to about 6 volts DC to the Peltier modules depending on the particular set point cooling temperature and the temperature of the conditioned air. In the heating mode, the controller can route up to about 12 volts DC to the Peltier modules depending on the particular set point heating temperature and the temperature of the conditioned air. The controller 290 is configured to provide DC output to the Peltier modules at varied voltages, depending on the particular heating or cooling condition, rather than providing a fixed voltage that is pulsed over time.

The controller 290 is configured to monitor the current draw of the Peltier modules 284 and to limit the power consumption of the Peltier modules if the current draw exceeds a predetermined value as required by the power source. The controller monitors the current draw and regulates power consumption so that the Peltier modules are operated at a maximum allowed current at all conditions. In this manner, the controller ensures that the maximum allowable current, as required by the power source, is not exceeded by the operation of the Peltier modules. The need to regulate the power consumption of the Peltier modules is especially important when the TCCS is used in applications powered by an electrical source, such as an electric powered automobile. In such an application, regulating the power consumption of accessory features has a direct impact on the range and driving performance of the vehicle.

While the fourth embodiment of the TCCS 238 has been described and illustrated with the third embodiment of the VTS 208, it is to be understood within the scope of this invention that other embodiments of the VTS can also be used in conjunction with the TCCS 238. For example, the TCCS 238 can be used to provide temperature conditioned air to the first and second embodiments of the VTS, 10 and 194, respectively, that are configured to accommodate convective heat transfer to a seated occupant. To accommodate use of these VTS embodiments with the TCCS 238 it may be necessary to modify the TCCS 238 by removing the air outlet tubing 280 from the intake 282 of the main fan 254 so that the heat pump does generate recirculating flow through the VTS. Rather the TCCS 238 configured in this manner provide temperature conditioned air to the VTS that is then passed through the VTS and to the seated occupant at the desired set point heating or cooling temperature.

Figure 12:
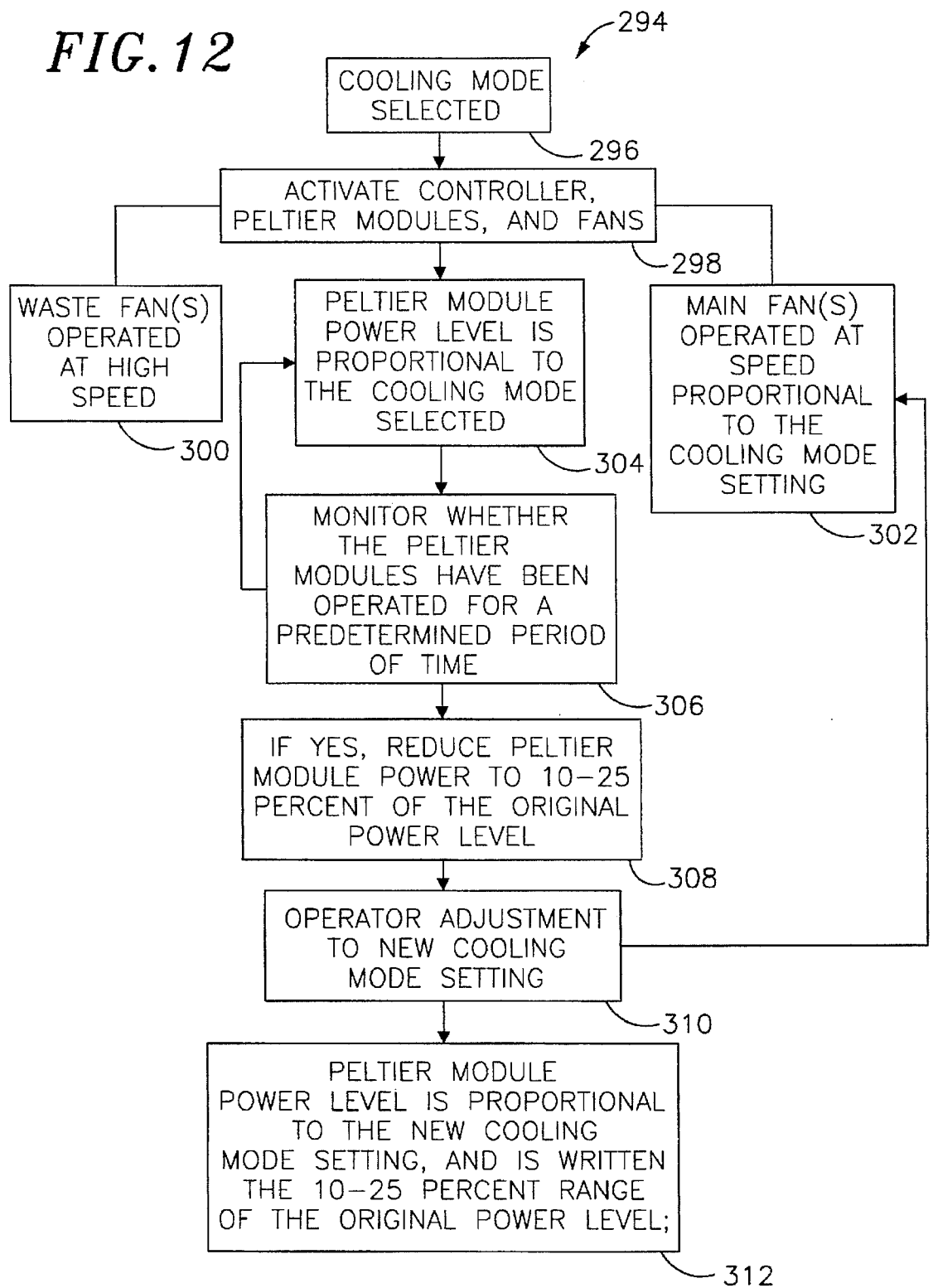
FIG. 12 is flow chart illustrating a cooling mode logic for a first controlling method used with the fourth embodiment of the invention shown in FIG. 11.

FIG. 12 is a flow chart illustrating a cooling mode control logic 294 for a first controlling method used to operate the TCCS 238 in a cooling mode of operation. An occupant wishing to use the VTS 240 operates the control switch 284 to provide a desired cooling temperature, i.e., sets the control to a cooling mode of operation (step 296). Alteratively, the cooling mode of operation can be selected automatically by, for example, thermostatic control based on a predetermined difference in temperature inside and outside of the vehicle. This activates the controller 290, Peltier modules 248, the main exchanger fan(s) 254 and waste exchanger fan(s) 256 (step 298). The waste fan(s) is operated at high speed (step 300).

The main fan(s) is operated at a speed proportional to the cooling mode setting. For example, if the cooling mode setting is low, i.e., a relatively high cooling temperature, the main fan(s) is operated at a low speed. If the cooling mode setting is high, i.e., a relatively low cooling temperature, the main fan(s) is operated at a high speed. And if the cooling mode setting is medium, i.e., a moderate cooling temperature, the main fan(s) is operated at a medium speed.

The Peltier modules are operated by receiving a level of power proportional to the cooling mode setting (step 304). For example, if the cooling mode setting is low, i.e., a relatively high cooling temperature, the Peltier modules receive a minimum level of power. If the cooling mode setting is high, i.e., a relatively low cooling temperature, the Peltier modules receive a maximum level of power. And if the cooling mode setting is medium, i.e., a moderate cooling temperature, the Peltier modules receive a moderate level of power. Accordingly, the cooling mode logic for the first controlling method regulates the operation of both the main fan(s) and the Peltier modules based on the particular cooling mode setting. The only input required by the seat occupant is the selection of a desired cooling temperature.

The cooling mode logic 294 monitors whether the Peltier modules have been operated for a predetermined length of time (step 306). In a preferred embodiment, the predetermined length of time is in the range of from 5 to 15 minutes. If the Peltier modules have not been operated for the predetermined length of time, power to the Peltier modules is maintained according to step 306. If the Peltier modules have been operated for the predetermined amount of time, the power to the Peltier modules is reduced to approximately 10 to 25 percent of the original power level (step 308). It is desired to decrease the amount of cooling provided to the VTS 240 after a predetermined amount of time to prevent overcooling a seated occupant's back, which has been shown to cause occupant discomfort.

If the occupant subsequently adjusts the control switch 284, or the control switch is automatically adjusted, to a new $T_s$ (step 310) after the power to the Peltier modules has been reduced (step 306), the cooling mode logic 294 continues to regulate the speed of the main fan(s) in a manner proportional to the new cooling mode setting (step 302), and regulate the level of power directed to the Peltier modules in a manner proportional to the new cooling setting, but within the 10 to 25 percent reduced power of step 308 (step 312).

Figure 13:
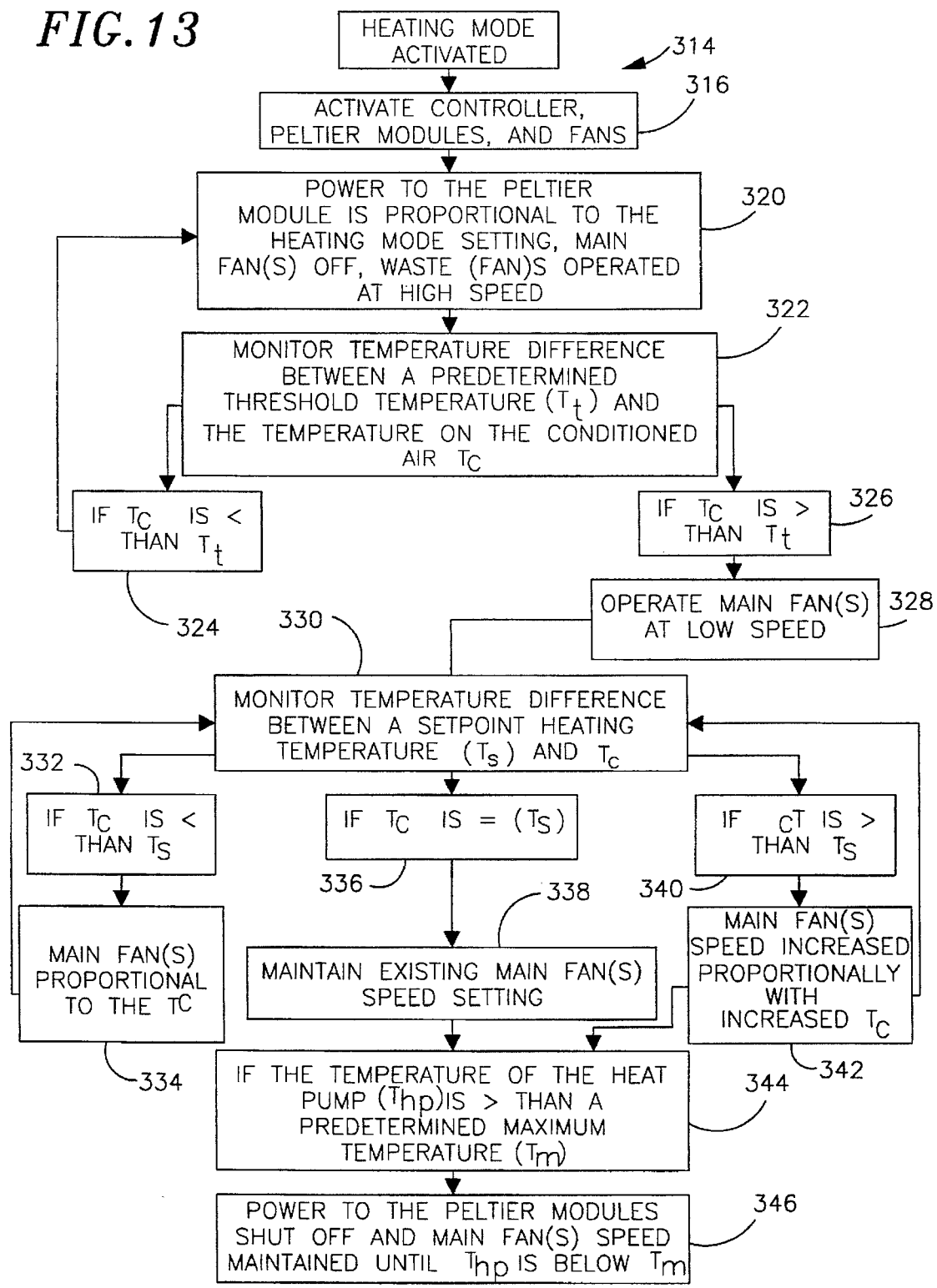
FIG. 13 is flow chart illustrating a heating mode logic for the first controlling method used with the fourth embodiment of the invention shown in FIG. 11.

FIG. 13 is a flow chart illustrating a heating mode control logic 314 for a first controlling method used to operate the TCCS 238 in a heating mode of operation. An occupant wishing to use the VTS 240 operates the control switch 284 to provide a desired heating temperature, i.e., sets the control to a heating mode of operation (step 316). Alteratively, as mentioned above, the heating mode of operation can be selected automatically by, for example, thermostatic control based on a predetermined difference in temperature inside and outside of the vehicle. This activates the controller 290, Peltier modules 248, the main exchanger fan(s) 254 and waste exchanger fan(s) 256 (step 318).

The heating mode logic provides power to the Peltier modules at a level proportional to the heating mode setting (step 320). For example, if a low heating mode setting is selected, i.e., a relatively low heating temperature, a minimum level of power is directed to the Peltier modules. If a high heating mode setting is selected, i.e., a relatively high heating temperature, a maximum level of power is directed to the Peltier modules. The heating mode control logic also keeps the main fan(s) off and operates the waste fan(s) at high speed (step 320).

The heating mode control logic 294 monitors the temperature difference between a predetermined threshold temperature ($T_t$) and the temperature of the conditioned air ($T_c$) (step 322), as provided by the temperature sensor 288. If $T_c$ is less than $T_t$ (step 324), i.e., the temperature of the conditioned air is cooler than the threshold temperature, the power to the Peltier modules is maintained at its original setting and the main fan(s) is off (step 320). If $T_c$ is greater than $T_t$ (step 340), the main fan(s) is operated at low speed (328). In a preferred embodiment, the predetermined threshold temperature is approximately 100° F. It is to be understood that the threshold temperature is arbitrary and is largely a function of the particular application of the TCCS and the particular embodiment of the VTS. It is desirable to maintain power to the Peltier modules while keeping the main fan(s) off until the $T_t$ is reached to achieve a rapid temperature rise within the main heat exchanger 250 and, thereby provide a rapid response time, i.e., reduce the time needed for the $T_c$ to reach a predetermined setpoint heating temperature.

Once the $T_c$ is greater than the $T_t$ and the main fan(s) is operated, the heating mode control logic 314 monitors the difference in temperature between a setpoint heating temperature ($T_s$) and the $T_c$. If the $T_c$ is less than the $T_s$ (step 332), i.e., the temperature of the conditioned air is below the heating mode setpoint temperature, the speed of the main fan(s) proportional with the $T_c$ (step 334). For example, as the $T_c$ increases so does the speed of the main fan(s). Increasing the main fan(s) speed with rising $T_c$ until the $T_s$ is reached promotes a rapid response time as well as a greater heating effect discussed above. If the $T_c$ is equal to the $T_s$ (step 336), the operation of the main fan(s) is maintained at the existing speed setting (step 338). If the $T_c$ is greater than the $T_s$ (step 340), the speed of the main fan(s) is increased proportionally with increased $T_c$ (step 342). For example, as the $T_c$ increases so does the speed of the main fan(s). Increasing the speed of the main fan(s) with increasing $T_c$ helps to remove the excess heat that is generated by the heat pump, thereby regulating the temperature of the conditioned air back to the $T_s$.

The heating mode logic 314 monitors the temperature of the heat pump ($T_{hp}$) 246, by use of the temperature sensor 286, and determines whether the $T_{hp}$ exceeds a predetermined maximum temperature ($T_m$) (step 344). If the $T_{hp}$ is greater than the $T_m$, the power to the Peltier modules is shut off and the main fan(s) speed is maintained until the $T_{hp}$ falls below the $T_m$ (346). In a preferred embodiment the predetermined maximum temperature is approximately 100° F. A heat pump temperature above the predetermined maximum temperature indicates that a malfunction in the heat pump has occurred. Shutting off power to the Peltier modules ensures that a seated occupant will not be harmed or suffer discomfort as a result of such malfunction.

Figure 14:
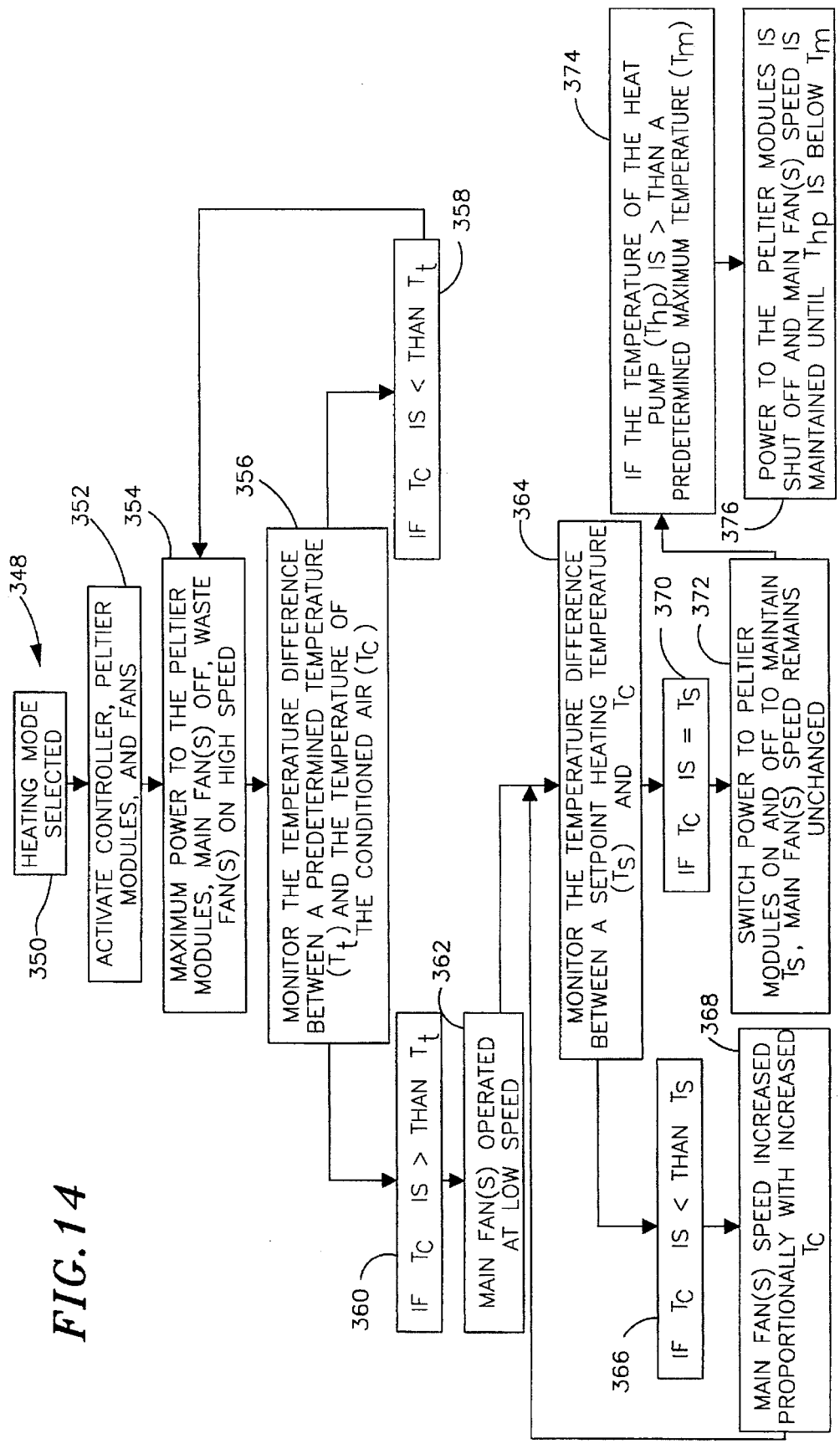
FIG. 14 is flow chart illustrating a heating mode logic for a second controlling method used with the fourth embodiment of the invention shown in FIG. 11.

A second controlling method for use with the TCCS 238 described and illustrated above includes a cooling mode control logic that is identical to the cooling mode control logic 294 described above and illustrated in FIG. 12 for the first controlling method. FIG. 14 is a flow chart illustrating a heating mode control logic 348 of the second controlling method used to operate the TCCS 238 in a heating mode of operation. An occupant wishing to use the VTS 240 operates the control switch 284 to provide a desired heating temperature, i.e., sets the control to a heating mode of operation (step 350). Alteratively, as mentioned above, the heating mode of operation can be selected automatically by, for example, thermostatic control based on a predetermined difference in temperature inside and outside of the vehicle. This activates the controller 290. Peltier modules 248, the main exchanger fan(s) 254 and waste exchanger fan(s) 256 (step 352).

The heating mode control logic 348 directs power at a maximum level to the Peltier modules, keeps the main fan(s) off, and operates the waste fan(s) at a high speed (step 354). The temperature difference between a predetermined temperature ($T_t$) and the temperature of the conditioned air ($T_c$), via the temperature sensor 288 is monitored (step 356). If the $T_c$ is less than the $T_t$ (step 358), i.e., the temperature of the conditioned air is below the predetermined temperature, the level of power directed to the Peltier modules is maintained and the main fan(s) is off (step 354). Like the heating mode control logic 314 for the first controlling method, maintaining maximum power to the Peltier modules while keeping the main fan(s), until a predetermined temperature is achieved, provides a rapid response from the time that the TCCS is activated to the time that a desired heating setpoint temperature is reached.

If the $T_c$ is greater than the $T_t$ (step 360), i.e., the temperature of the conditioned air is higher than the predetermined temperature, the main fan(s) is operated at low speed (step 362), maximum power to the Peltier modules is maintained (step 354), and the temperature difference between $T_t$ and $T_s$ is continuously monitored (step 356).

The heating mode control logic 348 monitors the difference in temperature between a setpoint heating temperature ($T_s$) and the $T_c$ (step 364). If the $T_c$ is less than the $T_s$ (step 366), i.e., the temperature of the conditioned air is below the setpoint heating temperature, the main fan(s) speed is increased in proportion with increased $T_c$ (368). For example, as the temperature of the conditioned air increases, the speed of the main fan(s) is increased. And conversely, as the temperature of the conditioned air decreases, the temperature of the main fan(s) is decreased. As the $T_c$ approaches $T_s$, the temperature difference between the two are constantly monitored (step 364).

If the $T_c$ is equal to the $T_s$ (step 370), the power to the Peltier modules is switched on and off, in the manner described above for the fourth embodiment of the TCCS 238, and the speed of the main fan(s) is unchanged (step 372). Accordingly, unlike the heating mode control logic 314 of the first controlling method described above, the power is routed the Peltier modules at a maximum level and is switched on and off for heat output adjustment, rather than receiving a level of power proportional to the heating mode setting.

The heating mode logic 348 monitors the temperature of the heat pump ($T_{hp}$) 246, by use of the temperature sensor 286, and determines whether the $T_{hp}$ exceeds a predetermined maximum temperature ($T_m$) (step 374). If the $T_{hp}$ is greater than the $T_m$, the power to the Peltier modules is shut off and the main fan(s) speed is maintained until the $T_{hp}$ falls below the $T_m$ (step 376). A heat pump temperature above the predetermined maximum temperature indicates that a malfunction in the heat pump has occurred. Shutting off power to the Peltier modules ensures that a seated occupant will not be harmed or suffer discomfort as a result of such malfunction.

A third controlling method for use with the TCCS 238 described and illustrated above includes a heating mode control logic that is identical to the heating mode control logic 348 described above and illustrated in FIG. 14 for the second controlling method. FIG. 15 is a flow chart illustrating a cooling mode control logic 378 of the third controlling method used to operate the TCCS 238 in a cooling mode of operation. An occupant wishing to use the VTS 240 operates the control switch 284 to provide a desired cooling temperature, i.e., sets the control to a cooling mode of operation (step 380). Alternatively, as mentioned above, the cooling mode of operation can be selected automatically by, for example, thermostatic control based on a predetermined difference in temperature inside and outside of the vehicle. This activates the controller 290, Peltier modules 248, the main exchanger fan(s) 254 and waste exchanger fan(s) 256 (step 382).

The main fan(s) is operated at a speed proportional to the cooling mode setting (step 384). For example, if the cooling mode setting is low, i.e., a relatively high cooling temperature, the main fan(s) is operated at a low speed. If the cooling mode setting is high, i.e., a relatively low cooling temperature, the main fan(s) is operated at a high speed. And if the cooling mode setting is medium, i.e., a moderate cooling temperature, the main fan(s) is operated at a medium speed. The waste fan(s) is operated at high speed (step 384).

The cooling mode control logic 378 monitors the difference in temperature between the temperature of the conditioned air ($T_c$), via the temperature sensor 288, and a setpoint cooling temperature ($T_s$) (step 386). If the $T_c$ is greater than the $T_s$ (step 388), i.e., the temperature of the conditioned air is above the setpoint cooling temperature, a maximum level of power is directed to the Peltier modules (step 390), and the temperature difference between $T_c$ and $T_s$ is continuously monitored. If the $T_c$ is less than the $T_s$ (step 392), a minimum level of power is directed to the Peltier modules (step 394), and the temperature difference between $T_c$ and $T_s$ is continuously monitored. If the $T_c$ is less than a predetermined minimum temperature ($T_m$) (step 396), power to the Peltier modules is shut off and the main fan(s) speed remains unchanged (step 398). A $T_c$ below $T_m$ indicates a malfunction in the heat pump and shutting off the Peltier modules ensures that a seated occupant will experience discomfort or harm from such malfunction.

If the $T_c$ is equal to the $T_s$ (step 400), the power to the Peltier modules is switched on and off to maintain the $T_s$, the speed of the main fan(s) remains unchanged (step 402), and the temperature difference between $T_c$ and $T_s$ is continuously monitored (step 386). Accordingly, once the $T_s$ is achieved, the power to the Peltier modules is adjusted, rather than the fan speed, to maintain the $T_s$. The cooling mode control logic 378 monitors the length of time that the Peltier modules have been operated and reduces the level of power directed to the Peltier modules to 10 to 25 percent of the original power level after a predetermined amount of time as passed (step 404). The speed of the main fans remain unchanged (step 404). In a preferred embodiment, the length of time is in the range of from 5 to 15 minutes. It is desired to decrease the amount of cooling provided to the VTS 240 after a predetermined amount of time to prevent overcooling a seated occupant's back, which has been shown to cause occupant discomfort.

Although the cooling and heating mode control logic for the first, second, and third controlling methods have been described above as being used with the fourth embodiment of the TCCS 238. It is to be understood that the first, second, and third controlling methods can be used with the other TCCS embodiments of this invention. For example, the first, second, and third controlling methods can be used to provide temperature conditioned air to a VTS configured to accommodate convective heat transfer to a seated occupant, as shown in FIG.

It is also to be understood that the embodiments of the TCCS described above and illustrated in FIGS. 1, 4, 6, 8 and 11 have been presented in a form to promote clarity and understanding of the invention. Accordingly, the TCCS system may be configured differently than illustrated. For example, the heat pumps used to provide temperature conditioned air to the VTS can be mounted within the seat bottom and/or seat back of the VTS itself, rather than being mounted external to the VTS. Additionally, the controller and control switches can also be mounted within the VTS itself.

The embodiments of the TCCS described above and illustrated can also be configured to provide temperature conditioned air to more than one VTS. For example, the TCCS illustrated in FIGS. 1, 4, 6, 8 and 11 can provide temperature conditioned air to a number of VTS seats using parallel air flow from one or more heat pumps operated by a respective TCCS heating and cooling control logic. Such an embodiment would be particularly useful in applications related to public transportation, such as planes, buses, trains and the like, where a number of occupants remain seated for extends period while traveling.

In addition to the embodiments of the TCCS specifically described above and illustrated, it is to be understood that such the TCCS may incorporate input from an energy management system, such as that used in electric powered vehicles. In specific embodiments, the TCCS is configured to accept an inhibit signal from such an energy management system. The inhibit signal is typically activated by a vehicle's energy management system under particular conditions of operation when an additional amount of energy is required or when the battery is being discharged to rapidly, such as during hard acceleration, when climbing a hill, or when the battery is weak or is approaching its minimum discharge voltage. The temperature climate control logic according to the present invention can be configured to deactivate the Peltier modules, the main exchanger fans, and the waste exchanger fans upon activation of the inhibit signal.

Accordingly, it is to be understood that, within the scope of the appended claims, the temperature climate control system according to principles of this invention may be embodied other than as specifically described herein.

What is claimed is:

1. A method for controlling the temperature climate in a variable temperature occupant seat, the method comprising the steps of:

selecting a temperature that effects a cooling mode of operation;

activating a number of thermoelectric modules to temperature condition a heat transfer medium to a desired cooling temperature;

activating at least one transporting means mounted adjacent the thermoelectric modules for passing temperature conditioned heat transfer medium from the modules to a variable temperature seat;

monitoring the temperature of the temperature conditioned heat transfer medium; and automatically regulating both the amount of power directed to the thermoelectric modules, and an operating speed of the transporting means to achieve the desired cooling temperature.

2. The method as recited in claim 1 wherein the heat transfer medium is air and the transporting means is a fan.

3. The method as recited in claim 2 comprising the step of automatically operating the fan at a speed proportional to the desired cooling level.

4. The method as recited in claim 3 comprising the step of automatically operating the thermoelectric modules at a power level proportional to the desired cooling level.

5. The method as recited in claim 2 comprising the step of monitoring a difference in temperature between the temperature conditioned heat transfer medium and the desired cooling temperature.

6. The method as recited in claim 4 comprising the step of automatically regulating the amount of electrical power directed to the thermoelectric modules based on the temperature difference.

7. The method as recited in claim 6 comprising directing a maximum level of electrical power to the thermoelectric modules when the temperature of the temperature conditioned heat transfer medium is greater than the desired cooling temperature.

8. The method as recited in claim 6 comprising directing a minimum level of electrical power to the thermoelectric modules when the temperature of the temperature conditioned heat transfer medium is less than the desired cooling temperature.

9. The method as recited in claim 6 comprising switching the electrical power to the thermoelectric modules on and off when the temperature of the temperature conditioned heat transfer medium is equal to the desired cooling temperature to maintain the desired cooling temperature.

10. The method as recited in claim 3 comprising reducing the amount of electrical power directed to the thermoelectric modules if the desired cooling temperature has been achieved for a predetermined amount of time.

11. The method as recited in claim 10 comprising reducing the amount of electrical power directed to the thermoelectric modules in the range of from 10 to 25 percent.

12. A method for controlling the temperature climate in a variable temperature occupant seat, the method comprising the steps of:

selecting a temperature that effects a heating mode of operation;

activating a number of thermoelectric modules to temperature condition a heat transfer medium to a desired heating temperature;

activating at least one transporting means for passing the temperature conditioned heat transfer medium into a variable temperature seat;

monitoring the temperature of the temperature conditioned heat transfer medium; and automatically regulating both the amount of power directed to the thermoelectric modules, and an operating speed of the transporting means to achieve the desired heating temperature.

13. The method as recited in claim 12 wherein the heat transfer medium is air and the transporting means is a fan.

14. The method as recited in claim 13 comprising directing electrical power at a maximum level to the thermoelectric modules and not operating the fan if the temperature of the conditioned air is below the predetermined threshold temperature.

15. The method as recited in claim 14 comprising operating the fan at a low speed if the if the temperature of the conditioned air is at or above the predetermined threshold temperature.

16. The method as recited in claim 14 comprising monitoring a difference in temperature between the desired heating temperature and the temperature of the conditioned air.

17. The method as recited in claim 16 comprising increasing the speed of the fan proportionally with increasing temperature of the temperature conditioned air when the temperature of the temperature conditioned air is greater than the desired heating temperature.

18. The method as recited in claim 16 comprising switching the electrical power directed to the thermoelectric modules on and off when the temperature of the temperature conditioned air is equal to the desired heating temperature for maintaining the desired heating temperature.

19. The method as recited in claim 13 comprising directing electrical power to the thermoelectric modules at a level proportional to the desired heating level, and not operating the fan.

20. The method as recited in claim 19 comprising monitoring a temperature difference between a predetermined threshold temperature and the temperature of the temperature conditioned air.

21. The method as recited in claim 19 comprising operating the fan at low speed if the temperature of the conditioned air is greater than the predetermined threshold temperature.

22. The method as recited in claim 19 comprising monitoring a difference in temperature between the desired heating temperature and the temperature of the conditioned air.

23. The method as recited in claim 22 comprising operating the speed of the fan in proportion to the temperature of the temperature conditioned air when the temperature of the temperature conditioned air is less than or greater than the desired heating temperature.

24. The method as recited in claims 16 and 19 comprising monitoring the temperature of the heat pump and shutting of electrical power to the thermoelectric modules if the temperature of the heat pump is greater than a predetermined maximum temperature.

* * * * *